United States Patent
Krishna et al.

(10) Patent No.: US 11,151,146 B2
(45) Date of Patent: Oct. 19, 2021

(54) SYSTEM AND METHOD FOR MULTI-DIMENSIONAL REAL TIME VECTOR SEARCH AND HEURISTICS BACKED INSIGHT ENGINE

(71) Applicant: Pelatro Pte. Ltd., Singapore (SG)

(72) Inventors: Arun K. Krishna, Bangalore (IN); Pramod K. Prabhakar, Bangalore (IN)

(73) Assignee: Pelatro Pte Ltd., Singapore (SG)

( * ) Notice: Subject to any disclaimer, the term of this patent is extended or adjusted under 35 U.S.C. 154(b) by 399 days.

(21) Appl. No.: 16/419,528

(22) Filed: May 22, 2019

(65) Prior Publication Data

US 2019/0361892 A1    Nov. 28, 2019

Related U.S. Application Data

(60) Provisional application No. 62/675,028, filed on May 22, 2018.

(51) Int. Cl.
| | |
|---|---|
| *G06F 16/24* | (2019.01) |
| *G06F 16/2458* | (2019.01) |
| *G06F 17/16* | (2006.01) |
| *G06F 16/18* | (2019.01) |

(52) U.S. Cl.
CPC ...... *G06F 16/2458* (2019.01); *G06F 16/1865* (2019.01); *G06F 17/16* (2013.01)

(58) Field of Classification Search
CPC ... G06F 16/2458; G06F 16/1865; G06F 17/16
See application file for complete search history.

(56) References Cited

U.S. PATENT DOCUMENTS

| | | | |
|---|---|---|---|
| 7,694,078 | B2 | 4/2010 | Setheraman et al. |
| 8,700,661 | B2 | 4/2014 | Pfeifle |
| 2018/0137155 | A1* | 5/2018 | Majumdar .............. G06F 16/28 |
| 2018/0173934 | A1* | 6/2018 | Zink ...................... H04N 5/374 |

OTHER PUBLICATIONS

Arnab Bhattacharya, Fundamentals of Database Indexing and Searching, "High Dimensionality Structures", Ch. 3, pp. 149-174, Version Date Sep. 30, 2014, CRC Press, Boca Raton, Florida 33487-2742.
Reiss, et al., "Efficient Multidimensional Searching Routines for Music Information Retrieval", Topic 5, The Box Assisted Method, 9 pages, (2001).

* cited by examiner

*Primary Examiner* — Mohammad S Rostami
(74) *Attorney, Agent, or Firm* — Richard Piercy; Mathew L. Grell; Grell & Watson Patent Attorneys LLC

(57) ABSTRACT

A method to improve, simplify, and facilitate multi-dimensional real time vector search and a provide a heuristics backed insight engine tool and a computer system to improve, simplify, and facilitate multi-dimensional real time vector search and provide a heuristics backed insight engine tool to provide real time, free flow, multi-dimensional search or query function of high volume, structured data to traverse to a point in generalized multi-dimensional Euclidean space without constraints of pre-identifying search dimensions.

20 Claims, 10 Drawing Sheets

SYSTEM AND METHOD FOR MULTI-DIMENSIONAL REAL TIME VECTOR SEARCH AND HEURISTICS BACKED INSIGHT ENGINE

CROSS-REFERENCE TO RELATED APPLICATIONS

To the full extent permitted by law, the present United States Non-provisional Patent Application hereby claims priority to and the full benefit of, United States Provisional Application entitled "Multi-Dimensional Real Time Vector Search & Heuristics backed Insight Engine," having assigned Ser. No. 62/675,028, filed on May 22, 2018, which is incorporated herein by reference in its entirety.

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE DISCLOSURE

Technical Field of the Disclosure

The instant disclosure generally relates to electric digital data processing, namely methods or arrangements for processing data by operating upon the order or content of the data handled. More particularly, the instant disclosure relates to sorting, i.e. grouping record carriers in numerical or other ordered sequence according to the classification of at least some of the information they carry by merging two or more sets of carriers in ordered sequence and selecting, i.e. obtaining data of one kind from those record carriers which are identifiable by data of a second kind from a mass of ordered or randomly-distributed record carriers.

Description of the Related Art

Most large businesses have a large volume of customers or subscribers. To accommodate the large volume of data associated with transactions related to their customers or subscribers, they may use one or more data stores sufficient to store a large volume of data concerning their customers or subscribers, their customers' or subscribers' activity or purchases, and other relevant data about their customers or subscribers. Day to day interactions and transactions may be recorded or collected, stored, processed, managed, or used to generate insights about the customers or subscribers. These data stores may often be repositories of information and data by which business and marketing operations may base their actions upon. Additionally, these data stores may be queried in order to find a particular customer or group of customers with one or more of a particular set of attributes. For instance, an accounts receivable department may need to obtain from its data store or data stores a list of subscribers whose invoice date falls on a particular day in the month and who have chosen to be automatically invoiced by credit card or ACH. In another instance, a marketing department may need to obtain from its data store a list of subscribers who have been a customer of the business for more than a specific number of years in order to reward those customers for their length of patronage. In yet another instance, a marketing department in a wireless telecommunications company may wish to focus on a particular subscriber population in order to increase its pre-paid data subscriptions, thereby needing a list of customers from the database who subscribe to a low amount of data in order to offer them a higher tier of data subscription.

In general, such data may be stored and even analyzed using an Enterprise Resource Planning (ERP) system or platform. Over the years, ERP systems and platforms have evolved to either include or interface with various business platforms such as Customer Relationship Managers (CRMs), subscriber usage monitors, accounting software, distribution platforms, and business intelligence solutions. The data store and corresponding ERP system or platform may function as a transactional system, as online transaction processing databases, as an operational database management system, as a distributed database system offering similar functionality, and/or a combination of the like, whereby the transaction itself may be performed utilizing the ERP system or platform and the resulting data need not be stored on, recorded on, or otherwise copied to or from a separate a centralized data store. The data store and corresponding ERP system or platform may often but not always be stored in a relational database or table on a server connected to a network.

When implemented in such a way, the central data store or distributed data stores from which the ERP system or platform operates may not function well to also easily query the data it stores or doing so may hinder the ability to process transactions for which it may be intended if simultaneously answering queries on live real-time data. To address this concern, organizations may segregate their transactional processing from their query processing by literally copying some or all of the data in their centralized data store used for transacting business onto a data store used for dedicated analyzation of the data, thus relieving any strain analyzing data may place on completing transactions. These separate data stores used for querying purposes are commonly called a data warehouse and may be updated manually or automatically according to a set schedule (e.g. hourly, daily, monthly, annually, etc.) or upon specific milestones or events. These data warehouses may include an index so as to expedite the time in which a query may be answered or completed. Depending on the size of the business and the relative size of its data store, in order to increase functionality, lower processing time, and decrease or more efficiently distribute storage consumption, a business may separate data among a variety of data warehouses based on how the data is intended to be used. By way of example, an accounts receivable department would likely not need to query the same data as an accounts payable department and may therefore have separate data warehouses. Similarly, international companies may choose to separate their data warehouse along state, regional, national, or continental boundaries or even maintain a plurality of data warehouses for state, regional, national and continental geographic areas. This type of data separation may have additional benefits such as the implied security of a department or business territory only having access to the data which it needs to function. Other benefits may include the ability to more succinctly index data according to time, product, service, customer, location, etc.

These smaller or separate data warehouses are often referred to as data marts, and may function by copying directly from the transactional data store the relevant data or by copying a subset of a data set stored on a centralized data warehouse. A data mart may be functionally and structurally indistinguishable from a data warehouse, except that a data mart exists in relation to a larger data set as a subset of that data along one or more specified characteristics. As described above, while they possess the advantage over their corresponding data warehouse in that they are more nimble and therefore faster and easier to access, query, process data from, and create, there are instances where cross-business queries or indexing may not be possible or practical, due to the segregation across data marts. Such cross-business querying or indexing may be best left to systems with access and means to query a more comprehensive data warehouse, and therefore may be forced to suffer from the disadvantages slower processing time one skilled in the art would expect when dealing with high-volume relational databases or tables. Consequently, when dealing with queries and indexing for high-level business intelligence, complex formulas or comprehensive indices may be necessary to submit queries to the larger data warehouse, which may require sophisticated business and computer programming skills, in addition to the increased processing capabilities of the equipment used to submit queries to the data warehouse.

One additional method to balance the need for high-volume data stores with the desire to simplify the methods of searching and querying the data store for information and lowering the processing power required to search and query the data store is to employ a different system and method of data organization and data indexing to more quickly query the data warehouse in the form of commonly used business terms, rather than the underlying database format. One such type of method of simplifying the process to query large data stores is providing or creating an index of the data contained in the data store.

While there may be many ways to accomplish providing or creating an index of the data contained in the data store, one such way that may be commonly employed by large organizations with large volumes of data is tree-based indexing. In a tree-based indexing system, data may be organized into records which are composed of fixed-length fields. Records can then be stored, queried, and accessed either sequentially or non-sequentially using skip-access techniques. A secondary set of hash tables commonly known as indexes may then contain pointers into the tables upon which data is stored on the data store, allowing individual records to be retrieved without having to search the entire data set stored on the data store. This is distinct from contemporaneous navigational databases, in which the pointers to other data were stored inside the records or data as stored on the data store itself. The key improvement in tree-based indexing is that the indexes are smaller than the larger volume of data to which they point and can be searched quickly, thereby allowing the database to access only the records it needs for an individual search or query. When a tree-based index is created, index nodes may be fixed in size or length, meaning their pointers would or may not change during insertions or deletions that occur later, and only the content of nodes may change as a consequence of the insertions and deletions. Due to this manner of fixing nodes in size or length, if insertions to a fixed node exceed any given node's capacity, new records must be stored outside the fixed size or length node in what are often referred to as overflow chains. If there are many more insertions than deletions from a table, these overflow chains may gradually become very large, which may affect the time required for retrieval of a record or a query or search on that particular category or trait.

While tree-based indexing on multiple columns can be very efficient, there are several downsides or trade-offs to using this method. In order to create and use the index, one must allot sufficient space to store the index. So long as the queries entered into an index-based system align with the columns by which the index was generated, the queries can run in an efficient manner. However, the more columns the index contains to facilitate queries efficiently along said columns, the more space the corresponding index will consume. This also does not allow free flowing searches or queries on an arbitrary set of indexed columns, but rather only works efficiently when either all or leading indexed columns are used in a query. Finally, a common implementation of a tree-based index system and method would be to develop multiple indexes for the same table or across multiple tables, each addressing different column-sets in pre-identified or common searches or queries. This may impose the unintended consequence or constraint of confining queries to a very small number or even just a handful of traits or categories upon which querying or searching is available to the end user.

The instant disclosure is designed to address at least some aspects of the problems discussed above. The multi-dimensional real time vector search and heuristics backed insight engine system and methods described herein may be designed to replace or work alongside these common database structures, index systems, and query methods, or may even simply have access to these databases to construct the alternative to the indexing systems and methods described above on a separate system having access to the data stores housing the data of interest. Use of the multi-dimensional real time vector search and heuristics backed insight engine system and methods described herein may help overcome many of the limitations of the systems and methods described above.

SUMMARY

Briefly described, in a possibly preferred embodiment, the present disclosure overcomes the above-mentioned disadvantages and meets the recognized need for such a system and method by encoding an N-dimensional profile into a first number or integer for use in a spatial vector search (a subscriber spatial search vector number), mapping a profile volume for M subscribers having N attributes into a second larger number or integer, translating a user input search query into a spatial orientation query, which is then evaluated onto the unfolded single dimensional larger number or integer using modulo arithmetic and bitwise arithmetic, and computing real time insights for on-the-fly analysis by sampling hits from the query results and aggregating them using a cached profile search, where N is the number of dimensions or attributes relevant to a given data set stored on a data store and M is the number of subscribers having data stored relevant to said dimensions or attributes. By first generating an N-dimensional profile into a first number or integer by which one may base a spatial vector search, then generating a second, larger number or integer based on the subscriber set, the resulting larger number or integer may be recognized as a tuple having N attributes, or a list of immutable sequences of values. The values stored for each subscriber within each tuple may correspond to data stored for each subscriber in a data store or they may correspond to a range of values related to each corresponding attribute or tuple. When searched or queried, the search may be translated into a spatial orientation query and using simple modulo division and bitwise operations to develop hits based on the query and return those hits as results. These hits or the results may be sampled randomly and the random samples may be cached in order to compute real-time insights based on the hits or results from the query.

In order to describe a potentially preferred embodiment of the disclosed system and method, it may be helpful to simplify the system and method into a small subscriber set having a limited number of attributes, then applying this framework to a much larger set of subscribers having a much larger number of attributes may be more easily comprehended. In an example of a data set stored on a data store having only 5 subscribers and only one attribute relevant to each subscriber, each subscriber could be assigned a decimal digit, or an integer which may be understood to be a subscriber spatial search vector number, in a larger integer. Each digit, or series of digits, in the integer would represent a single subscriber and that single attribute. In this instance, the larger integer may be 53,984 for a subscriber base with subscriber 1 having digit 5, subscriber 2 having digit 3 and so on. If one were to query this small database and thereby use modulo division and bitwise operations to determine which subscribers had an attribute corresponding to 3 which has a corresponding value associated with the digit 3, one skilled in the art would understand that subscriber 2 and subscriber 3 would be hits or results from this set of subscribers because these subscribers have associated digits that return no remainder when divided by 3, or rather return an associated remainder of zero when divided by 3. When extending this concept to data sets with thousands or millions of subscribers and attributes in the range of 500 or more, the resulting larger integer, which may be described as a subscriber store spatial search vector number, may exceed numbers in the order of $2^{800}$, which may be a number large enough to uniquely express every combination of traits, attributes, and characteristics of all subscribers in the subscriber store. Expanding upon this concept, if in a potentially preferred embodiment, the system and method were to use a base for the large subscriber integer sufficient to express all potential attributes for each individual subscriber, or a base (zeta), each digit may still represent a single subscriber and when translated into another base, such as base 10 or even binary, the corresponding integer of sufficient size may contain all data relevant to all subscribers while consuming only the data necessary to store such an integer. Accordingly, searching or querying this integer for subscribers having an attribute of interest may take place in a quicker fashion through use of modulo division and bitwise operations.

The benefits of structuring a query system and method in such a manner rather than indexing the underlying data set may be that it can allow for real-time search on a very large volume of data and very large subscriber sets without the imposition of often arbitrary constraints on the subset of traits, attributes, or characteristics available for querying. For instance, an organization having 100 million subscribers and business relevant attributes on the order of 500 traits, attributes, or characteristics may require either a large and/or multi-tiered index file which may be unwieldy to store and navigate, or a large number of index files which may face similar challenges or trade-offs. Since the index must be pre-formatted, stored, and updated based on traits, attributes, or characteristics made available for quicker searches or queries, such indexing may constrain the ability of a user to query for a particular trait, attribute, or characteristic quickly. Other challenges may include overflow tables when sufficient insertions occur in fixed sized indexes. By using a sufficiently large integer to store each attribute according to each subscriber, the organization may decrease the storage size required and may increase the number of possible distinctions among attributes on-demand without suffering a corresponding decrease in performance. Additionally, since primitive modulo arithmetic and bitwise operations can run very efficiently on modern computing equipment used by individuals within business organizations, the business organization may not have to dedicate expensive purpose-built equipment to querying functions within the organization.

Further efficiencies may be realized if certain attributes may require lesser or decreased granularity or resolution. For instance, some traits, attributes, or characteristics may be suitable to be defined in categories or ranges. One example may be the average monthly data consumption of a subscriber to a wireless telecommunications service. Since granularity down to the byte, megabyte, gigabyte, etc. of data consumption may be irrelevant to the telecommunications service business organization due to the practice of billing in discrete ranges of data consumption, the digits associated with each individual subscriber's data consumption may be placed into similar or identical discrete categories of data consumption, such as no consumption (00), less than 1 gigabyte (01), between 1 and 5 gigabytes (10), or above 5 gigabytes (11). These attributes could then be expressed using only 2 bits of data in binary per subscriber as shown in the parentheses. Similarly, a geographic billing address of subscribers may be only relevant to an organization within the business as to which region of geography the subscriber belongs. For example, for the United States, the regions may be the Northeast (1 or 00), the Southeast (2 or 01), the Midwest (3 or 10), and the West Coast (4 or 11). Again, on the subscriber integer, each subscriber's geographic region may be assigned accordingly and consume only 1 digit 1-3 in base 10 or only 2 bits in binary as indicated respectively in the parentheses. However, the granularity in each example may be expanded all the way down to the byte of data consumed or to the billing zip code, respectively, in the examples provided, thereby consuming additional resources as granularity or resolution increases, but only doing so at the order by which higher granularity or higher resolution of the data being queried is required.

In one aspect, the dimensions of the larger integer may be arranged in an order driven by business logic or in the order of priority. The order by which the dimensions are arranged may dictate the efficiency by which the underlying data being queried will proceed. Accordingly, a business or organization within a business may have very important traits, attributes, or characteristics which would be translated to dimensions. Those dimensions having the most importance may be arranged earlier in the subscriber series, and thereby receive a higher ranking, in order for that dimension to proceed more quickly during analyses or queries.

One benefit of the disclosed system and method may be reducing the need to dedicate specialized computing resources and time to building and updating indexes. By instead encoding an N-dimensional profile into a first number or integer for use in a spatial vector search, mapping a profile volume for M subscribers having N attributes into a second larger number or integer, translating a user input search query into a spatial orientation query, which is then evaluated onto the unfolded single dimensional larger number or integer using modulo arithmetic and bitwise arithmetic, and computing real time insights for on-the-fly analysis by sampling hits from the query results and aggregating them using a cached profile search, where N is the number of dimensions or attributes relevant to a given data set stored on a data store and M is the number of subscribers having data stored relevant to said dimensions or attributes, an enterprise implementing the disclosed system and method may enable more of its associates to query its subscriber base for relevant traits, attributes, and characteristics using real-time data relevant to individual business units. Since the enterprise would not be required to dedicate significant computing resources to building comprehensive tree-based indexes, it can instead generate queries on demand for specific business interests and insights.

Another benefit of the disclosed system and method may be that when transactional subscriber data is used for real time segmentation of subscriber profiles using ad-hoc user defined criteria, it can make available hundreds of searchable attributes grouped under a variety of categories. By way of example and not limitation, these categories may be demographics (e.g. age in network, geographic location), revenue data (e.g. daily, weekly, monthly averages by product type), spending habits (e.g. pre-paid minutes, data or recharge frequency), or bundle preferences (e.g. large or unlimited data package, unlimited minutes, unlimited SMS). When these categories are adapted to a graphical user interface used to generate these queries, one skilled in the art may realize the benefit of making available these categories in an interface which allows selection and user input to quickly perform searches or queries based on the selection and input, and returning the corresponding results in a summary format which provides the user with informative data regarding the subscribers queried. These summary formats may be made available in a variety of formats including, but not limited to, pivot tables, lists, spreadsheets, pie-charts, bar graphs, histograms, reports, and charts.

A related benefit of the disclosed system and method may be that combining queries or searches can also require less powerful resources or be completed in less time. For instance, instead of indexing and/or completing a query or search on a sophisticated data center having high volumes of RAM and high-end powerful processors, an end user of the disclosed system and method may be able to complete the assembly of a subscriber spatial search vector number and submit a query upon the subscriber spatial search vector number via a spatial orientation query on a consumer or business grade laptop or desktop, and possibly in some embodiments even via a mobile device. This may either free computing resources on the data center, enable queries in a wider variety of locations, lower costs associated with maintaining the data center, or avoid needing to establish a more sophisticated data center system, in favor of running the disclosed system and method on one of these such devices.

Yet another benefit of the disclosed system and method may be empowering smaller enterprises with the searching and querying capabilities of larger enterprises. Since the system and method of encoding an N-dimensional profile into a first number or integer for use in a spatial vector search, mapping a profile volume for M subscribers having N attributes into a second larger number or integer, translating a user input search query into a spatial orientation query, which is then evaluated onto the unfolded single dimensional larger number or integer using modulo arithmetic followed by bitwise operations, and computing real time insights for on-the-fly analysis by sampling hits from the query results and aggregating them using a cached profile search, where N is the number of dimensions or attributes relevant to a given data set stored on a data store and M is the number of subscribers having data stored relevant to said dimensions or attributes may require less computing power and sophistication, organizations which would otherwise not be able to justify the expenditure for or simply cannot afford the more powerful and sophisticated computing systems may be able to accomplish similar or identical results using much less powerful and sophisticated computing systems.

In select embodiments of the disclosed system and method, the end user interface of the implementation of the disclosed system and method may mimic the functionality of deploying comprehensive, elaborate, powerful and well-planned system and method of providing a tree-based indexing system. Since the building the larger number and using the search vector method may take very little time, even with less sophisticated or powerful computing equipment, the appearance to the end user may closely resemble, be indistinguishable from, or may even improve upon the performance realized from the implementation of querying data in a data store having a well-indexed system and a tree-based index system. For instance, in an implementation of an exemplary embodiment of the disclosed system and method in comparison to a traditional tree-based index system, a search query performed using the disclosed system and method was observed to be three to four times faster than the traditional system.

In an optional embodiment of the disclosed system and method, the time required to generate the larger integer, or a subscriber store spatial search vector number, from a very large subscriber data set stored on a data store, or a subscriber store, from the perspective of an end user, may be nearly instantaneous, at least in comparison to traditional tree-based index systems. Then each query on the resulting integer may be performed very quickly, as it uses primitive modulo division and bitwise operations on only a subset of digits of the integer, based on the user-selected query. Since limited resources are required to generate the larger integer and the successive queries, the queries may be performed on more up-to-date data than would be possible using tree-based indexing. Obviously, the greater the granularity or resolution required by the user may require greater system resources to generate the larger integer and compute the relevant query. In this embodiment, one skilled in the art could determine a sufficient compromise, based on the computing resources at their disposal and the needs of each business unit to access the most updated data. For instance, an enterprise which may have updated extremely large fixed-length or fixed-size index on an annual basis, may now be able generate its larger number on-demand or on a daily basis, thereby preserving the organization of the data and ease by which one may query the data stored on the data store while still making available more up-to-date information to the end user.

In select applications of the disclosed system and method, enterprises may realize concrete benefits to its capability of marketing more relevant information to its existing subscribers. Enterprises with very large subscription bases which offer a large variety of transaction types and subscription levels may require very comprehensive and elaborate indexing or tree-based index systems to properly monitor and query its subscribers' activities. When new services, transaction types or new subscription levels begin being offered to its clients, only a subset of its subscriber base may be likely to desire these new services. One way to determine who may be likely to desire a new service may be to identify those subscribers who currently subscribe to similar services. Another way to determine who may be likely to desire a new service may be to identify subscribers who may have previously subscribed to a similar service, but no longer do. By using the disclosed system and method of encoding an N-dimensional profile into a first number or integer for use in a spatial vector search, mapping a profile volume for M subscribers having N attributes into a second larger number or integer, translating a user input search query into a spatial orientation query, which is then evaluated onto the unfolded single dimensional larger number or integer using modulo arithmetic and bitwise arithmetic, and computing real time insights for on-the-fly analysis by sampling hits from the query results and aggregating them using a cached profile search, where N is the number of dimensions or attributes relevant to a given data set stored on a data store and M is the number of subscribers having data stored relevant to said dimensions or attributes without the need to develop elaborate and complex indexing systems or tree-based index systems, which may be impossible given the size of their data set or the constraints of their system. Therefore, a marketing department which desires to increase its subscriber base for a new offering may use the disclosed system and method to build the larger number as an alternative to indexing or building a tree-based index system. Then it could use the disclosed system and method of querying upon the larger number to clearly identify any relevant subscribers. Each time it has determined a population likely to desire the new service, it could export that population of subscribers to a tool used to directly market to its existing subscribers, thereby ensuring only relevant engagement with its user base and not endangering its credibility by offering irrelevant information about its services to those subscribers, which would unlikely or never desire the service.

These and other features of the disclosed system and method will become more apparent to one skilled in the art from the prior Summary, and following Brief Description of the Drawings, Detailed Description, and Claims when read in light of the accompanying Detailed Drawings.

BRIEF DESCRIPTION OF THE DRAWINGS

The present apparatuses, systems and methods will be better understood by reading the Detailed Description with reference to the accompanying drawings, which are not necessarily drawn to scale, and in which like reference numerals denote similar structure and refer to like elements throughout, and in which.

Figure 1:
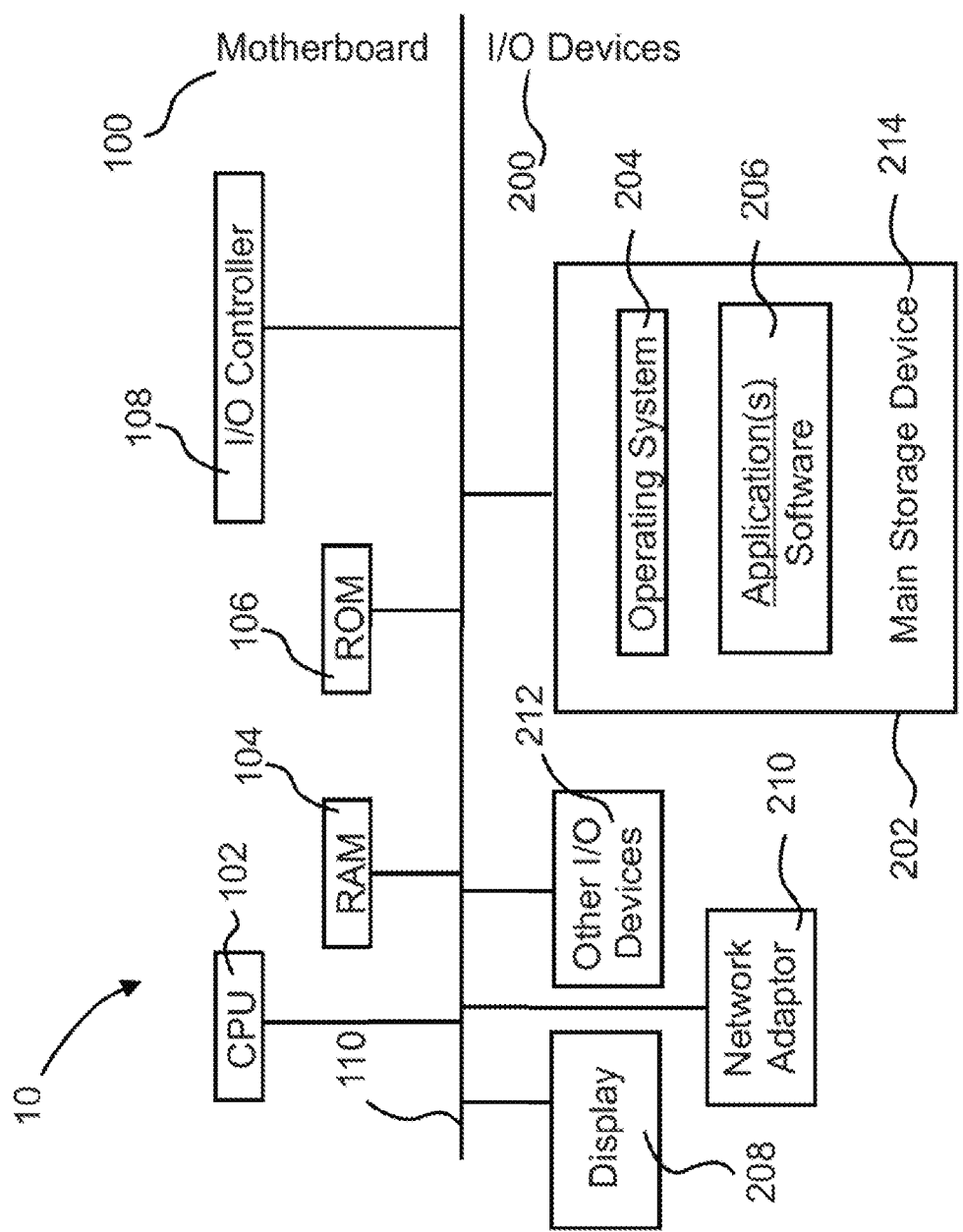
FIG. 1 is a block diagram of a computer system of the present disclosure.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in FIGS. 1-10, specific terminology is employed for the sake of clarity. The present disclosure, however, is not intended to be limited to the specific terminology so selected, and it is to be understood that each specific element includes all technical equivalents that operate in a similar manner to accomplish similar functions. The claimed invention may, however, be embodied in many different forms and should not be construed to be limited to the embodiments set forth herein. The examples set forth herein are non-limiting examples, and are merely examples among other possible examples.

In order to understand the present disclosure, certain variables need to be defined.

As will be appreciated by one of skill in the art, the present disclosure may be embodied as a method, data processing system, or computer program product. Accordingly, the present disclosure may take the form of an entirely hardware embodiment, entirely software embodiment or an embodiment combining software and hardware aspects. Furthermore, the present disclosure may take the form of a computer program product on a computer-readable storage medium having computer-readable program code means embodied in the medium. Any suitable computer readable medium may be utilized, including hard disks, ROM, RAM, CD-ROMs, electrical, optical, magnetic storage devices, solid-state drives (SSDs) and the like.

The present disclosure is described below with reference to flowchart illustrations of methods, apparatus (systems) and computer program products according to embodiments of the present disclosure. It will be understood that each block or step of the flowchart illustrations, and combinations of blocks or steps in the flowchart illustrations, can be implemented by computer program instructions or operations. These computer program instructions or operations may be loaded onto a general purpose computer, special purpose computer, or other programmable data processing apparatus to produce a machine, such that the instructions or operations, which execute on the computer or other programmable data processing apparatus, create means for implementing the functions specified in the flowchart block or blocks/step or steps.

These computer program instructions or operations may also be stored in a computer-usable memory that can direct a computer or other programmable data processing apparatus to function in a particular manner, such that the instructions or operations stored in the computer-usable memory produce an article of manufacture including instruction means which implement the function specified in the flowchart block or blocks/step or steps. The computer program instructions or operations may also be loaded onto a computer or other programmable data processing apparatus (processor) to cause a series of operational steps to be performed on the computer or other programmable apparatus (processor) to produce a computer implemented process such that the instructions or operations which execute on the computer or other programmable apparatus (processor) provide steps for implementing the functions specified in the flowchart block or blocks/step or steps.

Accordingly, blocks or steps of the flowchart illustrations support combinations of means for performing the specified functions, combinations of steps for performing the specified functions, and program instruction means for performing the specified functions. It should also be understood that each block or step of the flowchart illustrations, and combinations of blocks or steps in the flowchart illustrations, can be implemented by special purpose hardware-based computer systems, which perform the specified functions or steps, or combinations of special purpose hardware and computer instructions or operations.

Computer programming for implementing the present disclosure may be written in various programming languages, database languages, and the like. However, it is understood that other source or object-oriented programming languages, and other conventional programming language may be utilized without departing from the spirit and intent of the present disclosure.

Referring now to FIG. 1, there is illustrated a block diagram of a computer system 10 that provides a suitable environment for implementing embodiments of the present disclosure. The computer architecture shown in FIG. 1 is divided into two parts—motherboard 100 and the input/output (I/O) devices 200. Motherboard 100 preferably includes subsystems or processor to execute instructions such as central processing unit (CPU) 102, a memory device, such as random access memory (RAM) 104, input/output (I/O) controller 108, and a memory device such as read-only memory (ROM) 106, also known as firmware, which are interconnected by bus 110. A basic input output system (BIOS) containing the basic routines that help to transfer information between elements within the subsystems of the computer is preferably stored in ROM 106, or operably disposed in RAM 104. Computer system 10 further preferably includes I/O devices 202, such as main storage device 214 for storing operating system 204 and instructions or application program(s) 206, and display 208 for visual output, and other I/O devices 212 as appropriate. Main storage device 214 preferably is connected to CPU 102 through a main storage controller (represented as 108) connected to bus 110. Network adapter 210 allows the computer system to send and receive data through communication devices or any other network adapter capable of transmitting and receiving data over a communications link that is either a wired, optical, or wireless data pathway. It is recognized herein that central processing unit (CPU) 102 performs instructions, operations or commands stored in ROM 106 or RAM 104.

Many other devices or subsystems or other I/O devices 212 may be connected in a similar manner, including but not limited to, devices such as microphone, speakers, flash drive, CD-ROM player, DVD player, printer, main storage device 214, such as hard drive, and/or modem each connected via an I/O adapter. Also, although preferred, it is not necessary for all of the devices shown in FIG. 1 to be present to practice the present disclosure, as discussed below. Furthermore, the devices and subsystems may be interconnected in different configurations from that shown in FIG. 1, or may be based on optical or gate arrays, or some combination of these elements that is capable of responding to and executing instructions or operations. The operation of a computer system such as that shown in FIG. 1 is readily known in the art and is not discussed in further detail in this application, so as not to overcomplicate the present discussion.

Figure 2:
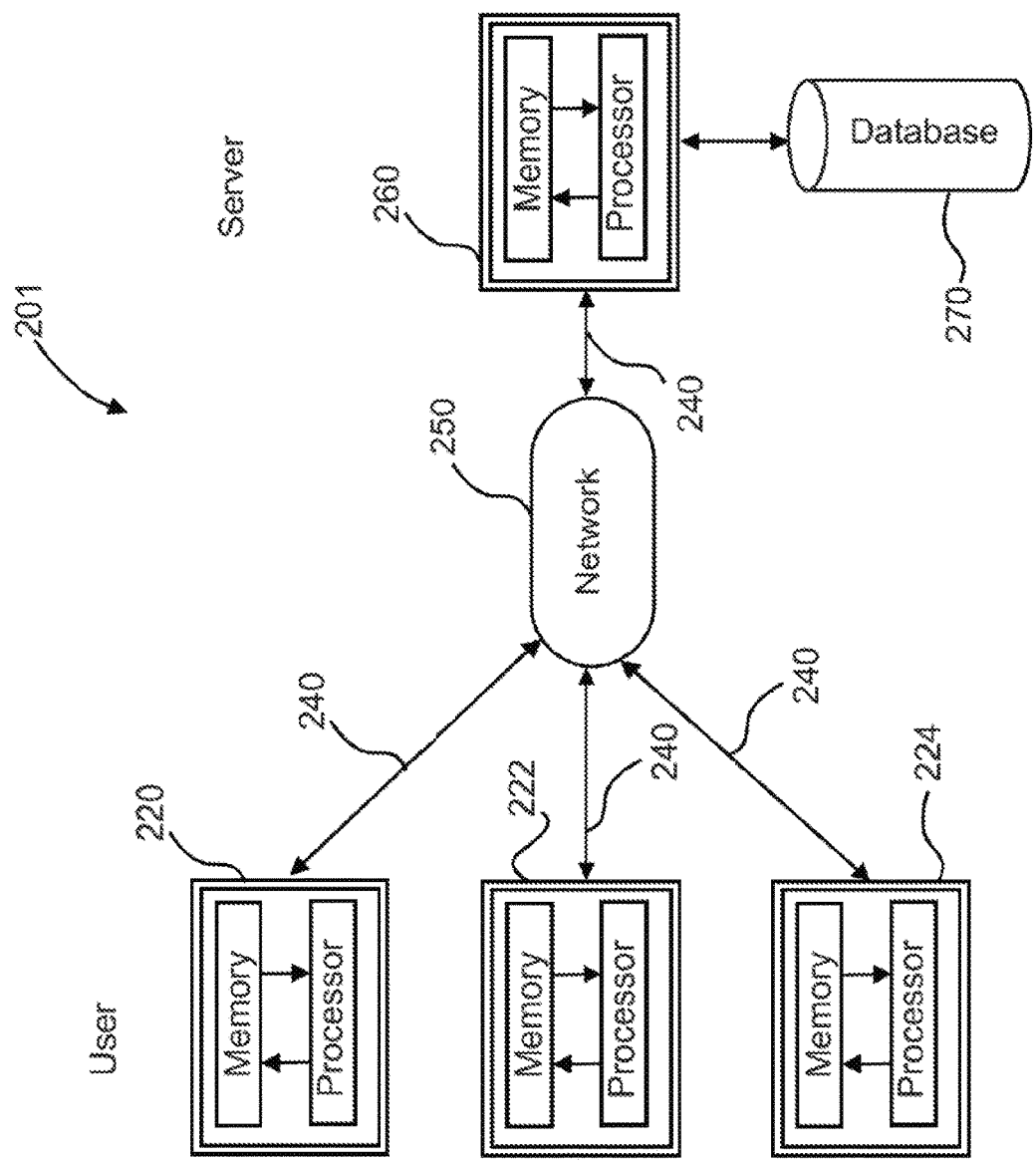
FIG. 2 is a block diagram of a communications system implemented by the computer system in FIG. 1.

Referring now to FIG. 2, there is illustrated a diagram depicting an exemplary communication system 201 in which concepts consistent with the present disclosure may be implemented. Examples of each element within the communication system 201 of FIG. 2 are broadly described above with respect to FIG. 1. In particular, the server system 260 and user system 220 have attributes similar to computer system 10 of FIG. 1 and illustrate one possible implementation of computer system 10. Communication system 201 preferably includes one or more user systems 220, 222, 224, one or more server system 260, and network 250, which could be, for example, the Internet, public network, private network or cloud. User systems 220-224 each preferably include a computer-readable medium, such as random-access memory, coupled to a processor. The processor, CPU 102, executes program instructions or operations stored in memory. Communication system 201 typically includes one or more user system 220. For example, user system 220 may include one or more general-purpose computers (e.g., personal computers), one or more special purpose computers (e.g., devices specifically programmed to communicate with each other and/or the server system 260), a workstation, a server, a device, a digital assistant or a "smart" cellular telephone or pager, a digital camera, a component, other equipment, or some combination of these elements that is capable of responding to and executing instructions or operations.

Similar to user system 220, server system 260 preferably includes a computer-readable medium, such as random-access memory, coupled to a processor. The processor executes program instructions stored in memory. Server system 260 may also include a number of additional external or internal devices, such as, without limitation, a mouse, a CD-ROM, a keyboard, a display, a storage device and other attributes similar to computer system 10 of FIG. 1. Server system 260 may additionally include a secondary storage element, such as database 270 for storage of data and information. Server system 260, although depicted as a single computer system, may be implemented as a network of computer processors. Memory in server system 260 contains one or more executable steps, program(s), algorithm(s), or application(s) 206 (shown in FIG. 1). For example, the server system 260 may include a web server, information server, application server, one or more general-purpose computers (e.g., personal computers), one or more special purpose computers (e.g., devices specifically programmed to communicate with each other), a workstation or other equipment, or some combination of these elements that is capable of responding to and executing instructions or operations.

Communication system 201 is capable of delivering and exchanging data between user system 220 and a server system 260 through communications link 240 and/or network 250. Through user system 220, users can preferably communicate over network 250 with each other user system 220, 222, 224, and with other systems and devices, such as server system 260, to electronically transmit, store, print and/or view multidimensional digital master image(s) 303 (see FIG. 3). Communications link 240 typically includes network 250 making a direct or indirect communication between the user system 220 and the server system 260, irrespective of physical separation. Examples of a network 250 include the Internet, cloud, analog or digital wired and wireless networks, radio, television, cable, satellite, and/or any other delivery mechanism for carrying and/or transmitting data or other information, such as to electronically transmit, store, print and/or view multidimensional digital master image(s) 303. The communications link 240 may include, for example, a wired, wireless, cable, optical or satellite communication system or other pathways.

It is contemplated herein that RAM 104, main storage device 214, and database 270 may be referred to herein as storage device(s) or memory device(s).

Referring again now to FIGS. 1-8, by way of example, and not limitation, therein is illustrated various example methods of assembling data from a database 270 into various arrangements for analysis and reporting. Database 270 may be referred to as data store therein. Subscriber and customer may be used interchangeably. Although subscriber and customer information and data may be contained on database 270, the disclosure is not so limited, the disclosed method and system may be used on any large volume of data, and may contain transactional data and information pertaining to or regarding subscribers, customers, clients, and/or a plurality of individuals and/or human beings, whether living or dead, or physical or non-physical constituents of matter including, but not limited to, animals, plants, other living or non-living single or multicellular organisms, machines, artwork, digital files, objects, ingredients, inventory, components, chemical molecules, intra- or inter-stellar objects, the like, and/or combinations thereof. Furthermore, business and enterprise may be used interchangeably. Although business and enterprise and any data each may possess are used herein to describe the disclosed system and method, the disclosed system and method may be useful to many types of organizations including, but not limited to, firms, organizations, non-profits, educational institutions, governments, legislative bodies, governmental or quasi-governmental agencies, research institutes, military or quasi-military operations, advocacy organizations, nation states, international coalitions, the like, and/or combinations thereof. It should be understood that various steps of the disclosed method and/or various features of the disclosed system may be assumed to be present in the figures as they would be required for the disclosed system to function and for the disclosed method to be performed. For instance, the requesting of subscriber data and/or accessing of a subscriber data set stored on a subscriber data store, or a subscriber store, may be absent from various method steps as this step may take place from a variety of locations, including but not limited to a machine of the subscriber data store itself, a machine on the network of the subscriber store, or a machine having secure access to the subscriber store via the internet by which it may remotely connect. Furthermore, one skilled in the art would know that facilitating real-time multi-dimensional real-time vector searches or multi-dimensional vector searches upon data in a subscriber store may be performed on a distributed subscriber store via a software or a software as a service, and may have functionality similar to or exactly like a cloud-based software service. Finally, as referred to herein, the terms integer, number, and number line may be used interchangeably, except as differentiated herein.

Figure 3:
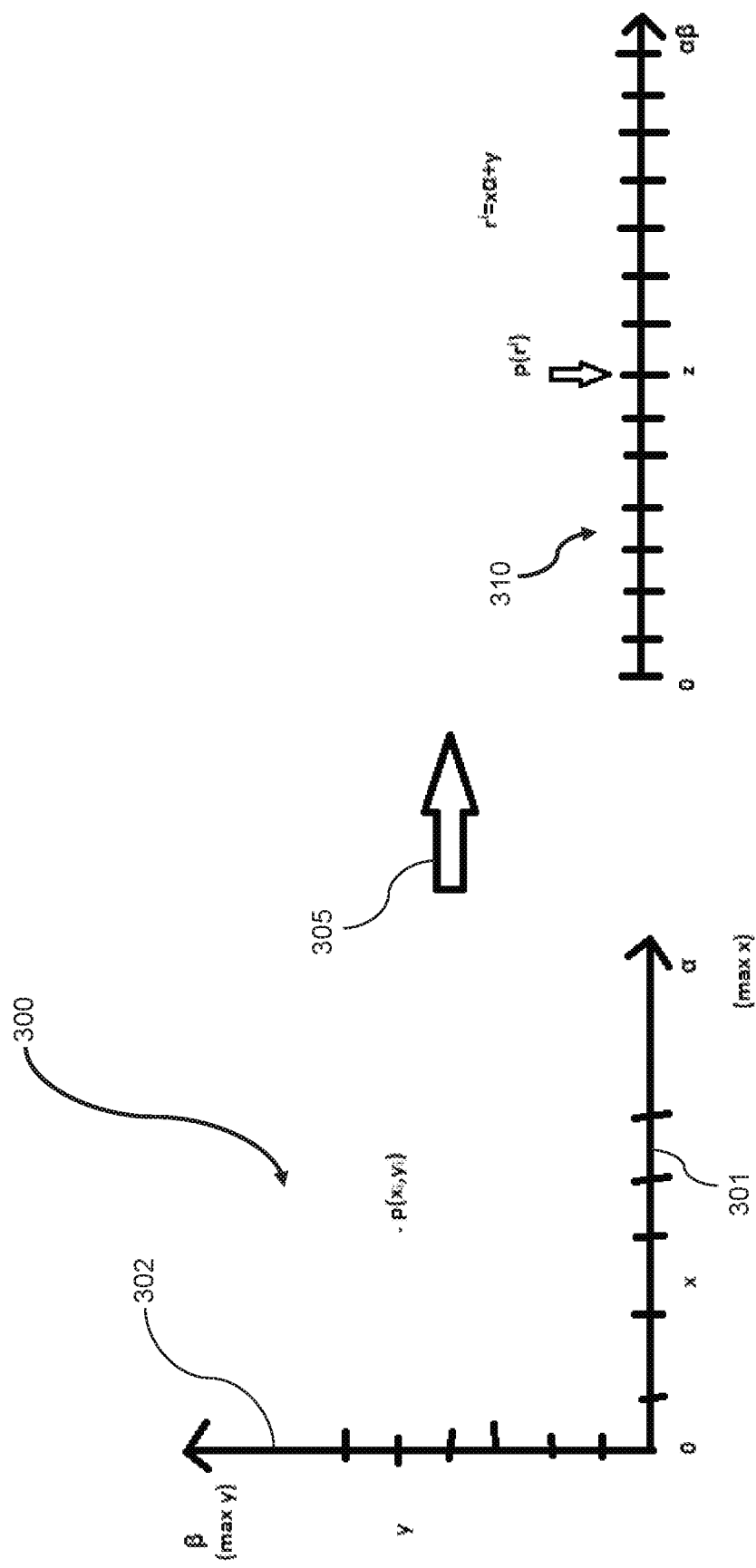
FIG. 3 is a chart to demonstrate flattening of a two-dimensional graph into a single-dimensional line.

Referring now to FIG. 3, there is illustrated a chart to demonstrate flattening of a two-dimensional graph into a single-dimensional line. In order to sufficiently understand the disclosed system and method, it is important to first understand that any two or more dimensional space may be condensed along a single-dimensional line or integer using concepts that will be familiar to those skilled in the art. Illustrated in FIG. 3 is a two-dimensional graph 300 along which there is an x-axis 301 and a y-axis 302. This may be flattened or condensed at step 305 into a single-dimensional line or z-axis 310. Here, it is also important to understand that ordering of dimensions when placing x-axis 301 and y-axis 302 of two-dimensional graph 300 onto single-dimensional line or z-axis 310 may be irrelevant and that every point represented within two-dimensional graph 300 may be represented by an n-tuple uniquely, where "n" is the number of dimensions in the dimensional space being condensed into a line or integer. Here two-dimensional graph 300 would have 2-tuples per point on the graph when condensed into a single-dimensional line or z-axis 310. Therefore, converting a point $p(x_i,y_i)$ from two-dimensional graph 300 onto single-dimensional line or z-axis 310 would be done using $p(r^i)$ where $r^i=x\alpha+y$. The same logic may be extrapolated to unfold any "n" dimensional bound volume into a single dimensional line which may be called a subscriber spatial search vector number. Considering an "n" dimensional space with the ordered dimension set "D", $\{d_1, d_2, \ldots, d_n\}$ and corresponding weights "W", $\{w_1, w_2, \ldots, 2_n\}$, the numeric translation for any point P $\{v_1, v_2, \ldots, v_n\}$ may be mapped onto a subscriber spatial search vector number "Z" or subscriber spatial search number line using the equation $Z=v_1*w_1+v_2*w_2+\ldots+v_n*w_n$. As used herein, "weights" refers to an ordered set of elements where each item is called a weight, essentially representing the total dimensional volume created by the subsets of dimensions preceding any value on the subscriber spatial vector number or subscriber spatial vector number line. From a visualization or conceptualization standpoint, a weight may be best described as a hypercube volume constructed from all higher ranked dimensions in an ordered list. The weight multiplier for any dimension "j" where 1<j<n is nothing but the total dimensional volume created by the (n−j+1) dimensional space determined by $\{d_{j+1}, d_{j+2}, \ldots, d_{jn}\}$. If the bounds or range of each dimension are denoted by "B", $\{b_1, b_2, \ldots, b_n\}$, the weight multiplier can then be computed using the formula $W_j=bj_{+1}* b_{j+2} * \ldots * b_n$. The range of the subscriber spatial search vector number or subscriber spatial search vector number line may be dimensionally equivalent to $W_1$, or the total volume formed by bound enclosure D. The subscriber spatial search vector number or subscriber spatial search vector number line may then be encoded in binary using "k" bits, where $k=Log(W_1)$ in base 2 or binary. A plurality of subscriber spatial search vector numbers or subscriber spatial search vector number lines are assembled for each subscriber, of a total of "M" subscribers, based on the dimensions of interest, then iteratively laid next to one another sequentially to form a subscriber store spatial search vector number or subscriber store vector search number line. Ultimately, the subscriber store spatial search vector number would be an extremely large integer having M digits in base Z (Zeta) and a subscriber store spatial search vector number line would be a very large number line having M points along the number line in base Z. For the sake of simplification, the subscriber store spatial search vector number may be an integer having M digits in base Z, where M is the number of subscribers and Z is the total enclosure volume for all searchable dimensions, thereby each digit would describe all characteristics of a single subscriber and the integer would describe all characteristics of all subscribers. This subscriber store spatial search vector number or subscriber store spatial search vector number line can be used to locate subscribers having traits, attributes, or characteristics of interest that when converted into a digitized spatial query, may be useful in a Boolean search or query function upon the number using modulo arithmetic and bitwise arithmetic and returning subscribers as results when remainders of modulo division equals zero and when bitwise operations confirm each bit in the query to match each subscriber bit for digits representing a given subscriber, the steps of which are further described below.

Figure 4:
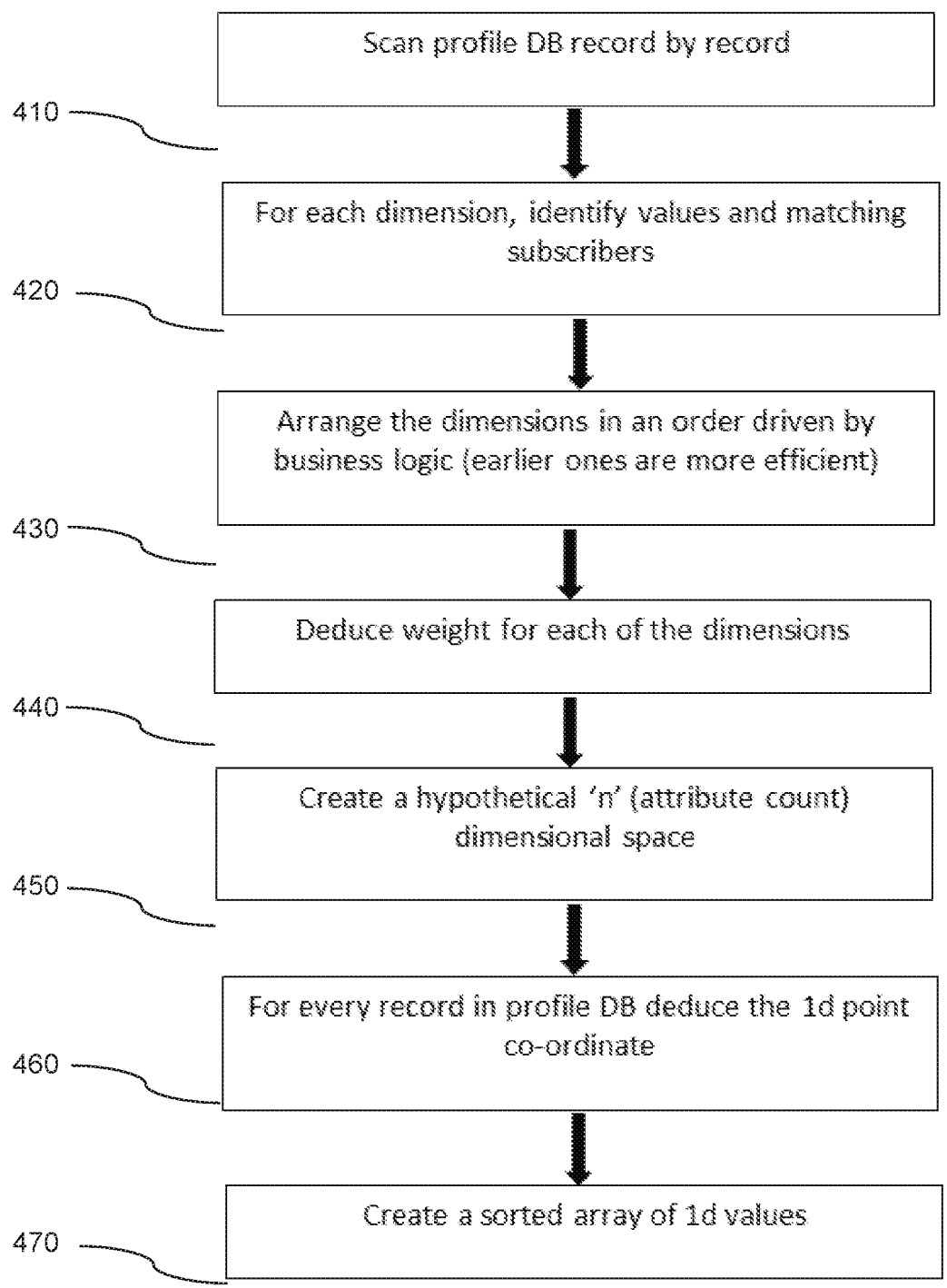
FIG. 4 is a flowchart showing the disclosed method steps to convert a subscriber profile data store into a large integer or number line.

Referring now to FIG. 4, there is illustrated a flowchart show the disclosed method steps to convert a subscriber profile data store into a large integer or number line composed of individual subscriber spatial search vector numbers in order to establish the subscriber store spatial search vector number. Starting at step 410, the disclosed system and method may first require scanning the database, data set, or subscriber store on a data store record-by-record. Areas of interest would include each trait, attribute, or characteristic stored on the database, data set, or subscriber store on a data store for each subscriber. Traits, attributes, or characteristics for each subscriber may fit into discrete categories each having ranges. At step 420, each trait, attribute, or characteristic that may fit into a category having a range may be assigned a dimension and each dimension would have a corresponding population of subscribers who may be associated with that trait, attribute, or characteristic that may fit into a category and thereby have a value associated with that dimension. Then at step 430, based on the business intelligence importance or frequency of use of any given trait, attribute, or characteristic and corresponding dimension, the dimensions may be ranked in order of importance—the most important being placed or ranked highest or first in the series so as to provide greater efficiency during queries due to capabilities such as RAM access skip scans. At step 440, the weights of each dimension may be deduced by calculating the total dimensional volume created by each dimension as described above. At step 450, a hypothetical "n" attribute count would be created for each dimension in order to calculate the dimensional space required for that dimension, a higher attribute count associated with a higher resolution or granularity. In this step 450, an attribute which requires greater granularity would be given a greater attribute count at the expense of consuming greater dimensional space and thereby consuming more resources to create the subscriber store spatial search vector number. One skilled in the art would recognize that a given attribute may be represented by a very precise value or may instead be substituted for a range of values represented by a single value. By way of example and not limitation, an average monthly data consumption for each among many telecommunications subscribers may be assigned the precise calculated value, such as 1.2435 GB/Mo., or may be broken down into categories 1, 2, 3, 4, and 5, each category representing a range of less than 500 MB/Mo., 500 MB-1 GB/Mo., etc., and those categories could be assigned a numerical value of 1, 2, 3, 4, or 5. At step 460, every record in the subscriber profile store a subscriber spatial search vector number is determined using the system and method to determine the subscriber spatial search vector number for each subscriber. Finally, at step 470, a sorted array of subscriber spatial search vector numbers is generated from all subscribers in the subscriber store.

Figure 5:
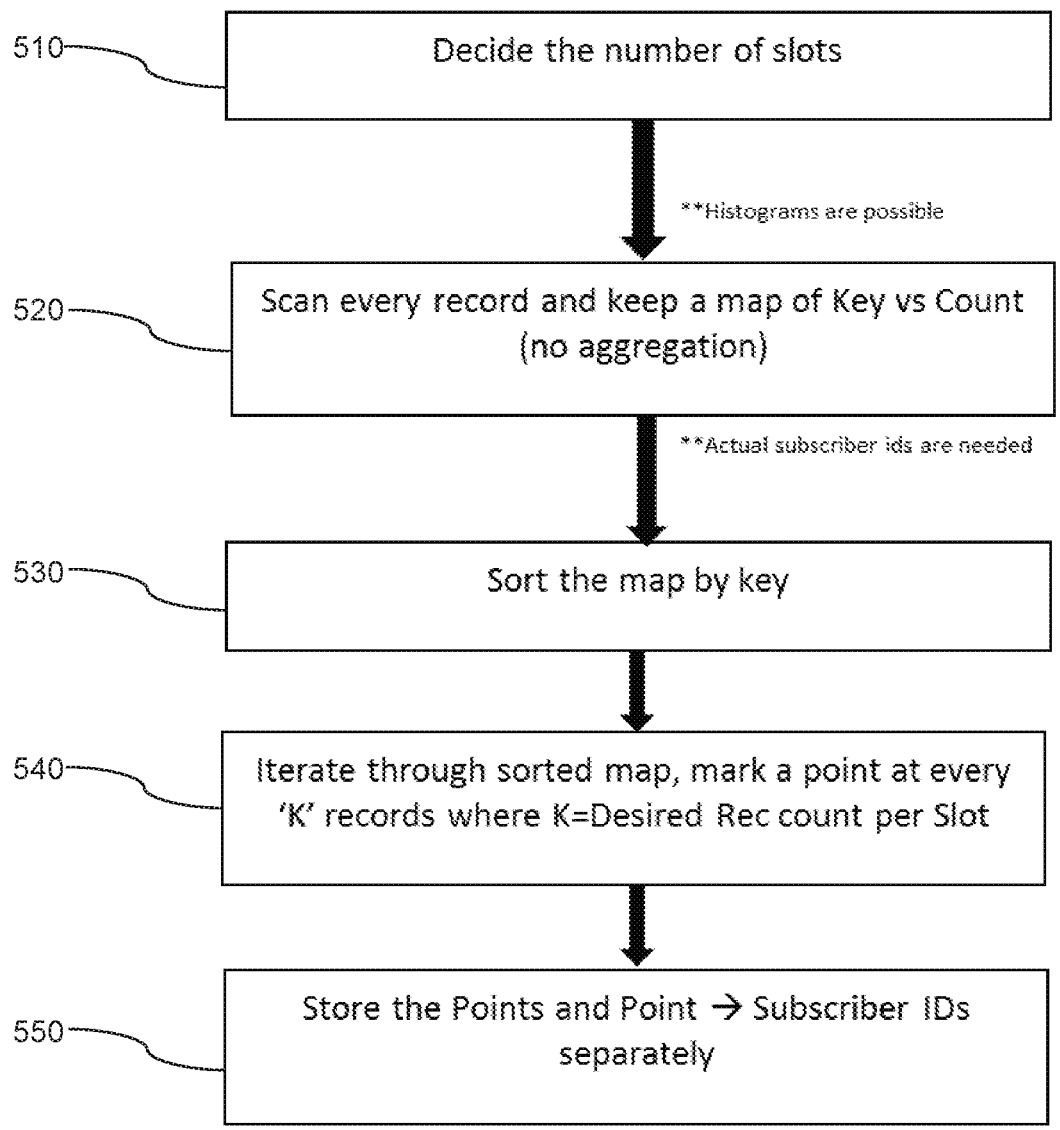
FIG. 5 is a flowchart showing the disclosed method steps to determine milestones for a dimension.

Referring now to FIG. 5, there is illustrated a flowchart showing the disclosed system and the underlying method steps to determine milestones for a dimension. Starting at step 510, a business or enterprise would first need to determine an appropriate number of slots to allocate to a given dimension, wherein slots may be understood as the number of bits required to sufficiently represent all required or possible values of a given subscriber trait, attribute, or characteristic. It is important when allocating slots to a given dimension that one skilled in the art be mindful that the properties and performance benefits of the disclosed system and method may diminish as a function of the magnitude of the overall subscriber store spatial search vector number, which may increase as the number of slots allocated increase at this step. As discussed above, when using the system and method of creating subscriber spatial search vectors to build a subscriber store spatial search vector, certain considerations must be made in order to determine how granular or high-resolution the data must appear to an end user. A greater number of slots assigned to a given dimension means a greater RAM or storage allocation for that dimension and potentially could mean slower processing time or decreased performance of the system as a whole. One skilled in the art and knowledgeable of the granularity of the business's or enterprise's resolution needs and relevant performance of its systems deploying the disclosed system and performing the disclosed method could determine that some fields require very high granularity and resolutions, while other fields may be approximated, rounded, or assigned ranged values. By way of example and not limitation, a monthly spend field may be particularly important and thereby require granularity down to the penny. If total monthly spend per subscriber never exceeds $40.96, 4096 slots could be assigned to this dimension so only 12 bits would need to be consumed by each subscriber spatial search vector number for each subscriber for this dimension. Should higher spend be present in the subscriber store, another bit could be added to drastically increase the number of slots available. Should lower resolution be required, 1024 slots could be available to represent data rounded down to the dime in subscriber stores reaching maximum values of only $102.40 and consume 2 fewer (10) bits of space per subscriber in each subscriber spatial search vector number in the subscriber store spatial search vector number. These possibilities, given these considerations, may be endless and must be determined by one skilled in the art in regard to the business and machine-performance considerations when implementing the disclosed system and performing the disclosed method. Moving to step 520, every subscriber record is scanned and a map of key versus count is kept without aggregating this information. Here, the key may refer to each distinct value possible in the domain or dimension. By way of example and not limitation, key may mean all possible cities for all subscribers in the subscriber store and may be therefore a relatively small, finite number, or may mean the daily data consumption down to the byte of data consumed and require a very high number of possible combinations. Again, depending on the number of slots assigned at step 510, this scan may fluctuate in regard to resources required based upon the granularity and resources necessary to summarize the underlying data into each dimension of each subscriber spatial search vector number. At step 530, the map generated in step 520 is sorted by key, or by each discrete value in each dimension. At step 540, the sorted map built in steps 520-530 is then iterated and points may be marked at every "K" records where K may mean the desired record count per slot or in light of the total number of records and total number of desired or available slots as determined in step 510. Finally, the points marked at step 540 are stored separately from each subscriber identifier or identification number.

Figure 6:
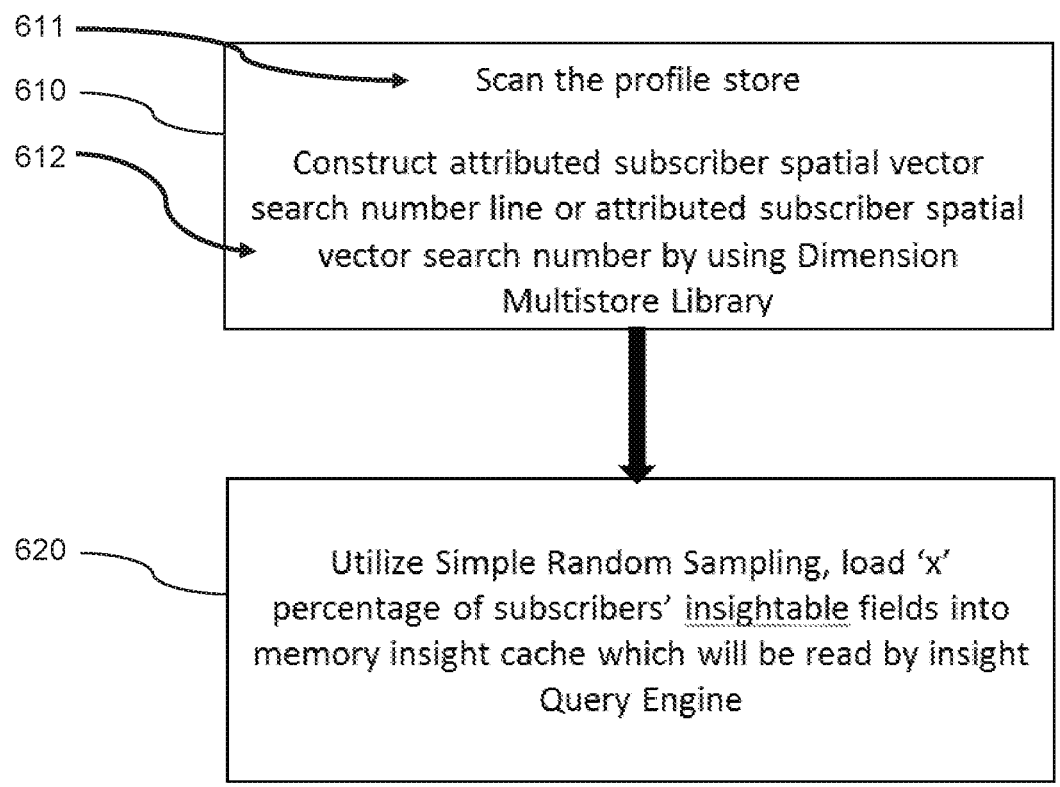
FIG. 6 is a flowchart showing the steps to initialize an optional embodiment the disclosed system and method.

Referring now to FIG. 6, there is illustrated a flowchart showing the steps to initialize an optional embodiment the disclosed system and method. In this optional embodiment, at step 610, the steps of FIGS. 4-5 are performed to construct the subscriber spatial search vector numbers and the subscriber store spatial search vector number by scanning the subscriber profile store at step 611 and constructing these numbers at step 612. Having these numbers constructed, in an optional embodiment of the disclosed system and method, at step 620, simple random sampling may be utilized on "x" percent of subscribers and then one may generate statistics based on that percentage of subscribers sampled. The insightable fields associated with the "x" percentage of subscribers are then loaded into a memory insight cache which will then be available for reading by an insight query engine, or a heuristics-backed insight engine. This can be used to develop insights for the business or enterprise either on the subscriber population as a whole, a sample of the subscriber population based on a query which limits the statistics to a sub-population having the traits, attributes, or characteristics of the query executed, or by comparing the sub-population to the overall subscriber population to determine other characteristics that those subscribers may share in comparison or contrasting to the overall subscriber population. For instance, querying the subscriber store profiles for subscribers who on average consume more than 1000 minutes of voice per month may yield an insight as to how much those subscribers spend on average per month in comparison to the overall subscriber population. This optional embodiment may be used in conjunction with or separately from the ability to query on an individual subscriber basis, as discussed further in the description of FIG. 7.

Figure 7:
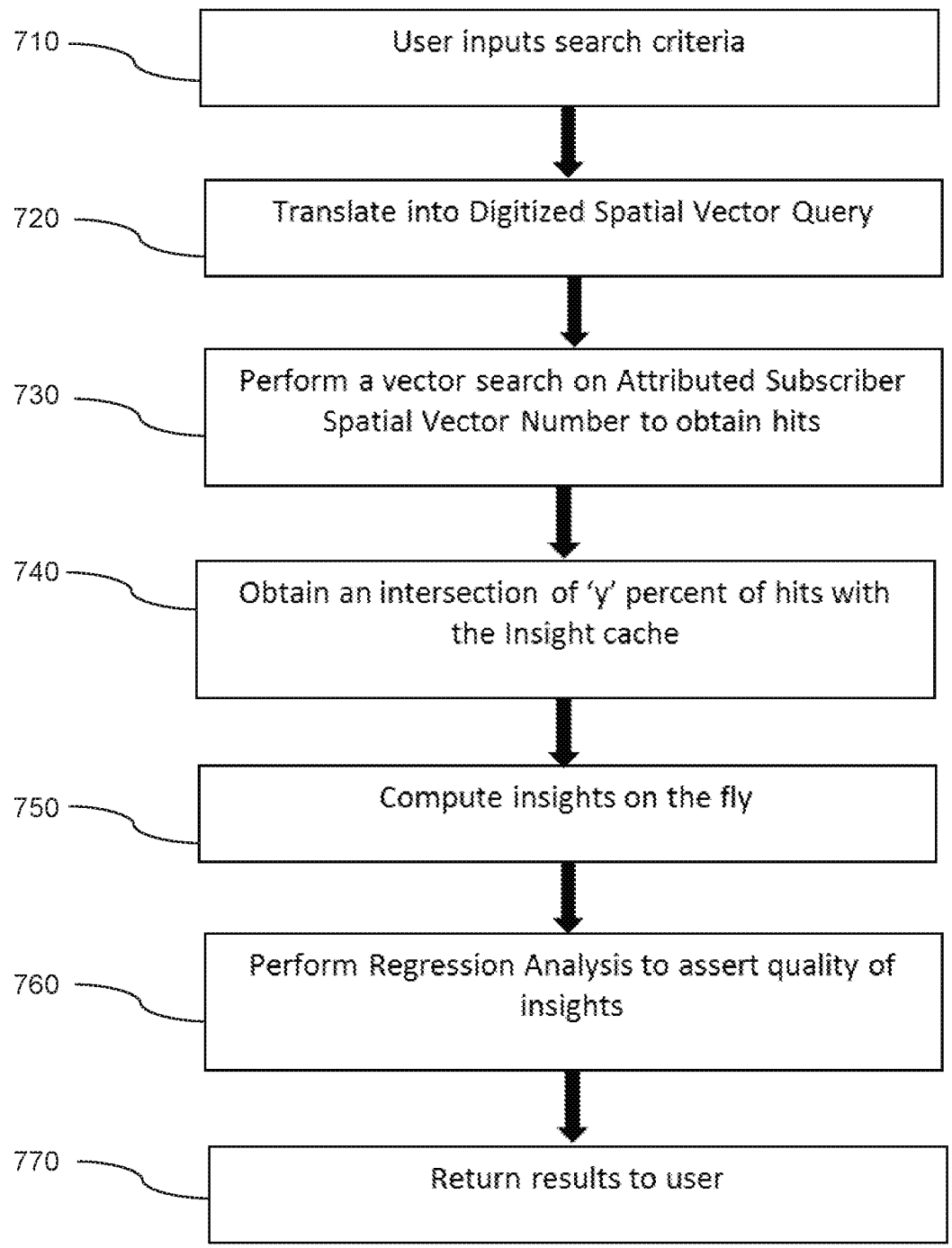
FIG. 7 is a flowchart showing the steps to execute a search or query from an end user using the disclosed system and method.

Referring now to FIG. 7, there is illustrated a flowchart showing the steps to execute a search or query from an end user using the disclosed system and method. Starting at step 710, an end-user may enter a search criterion based on a given set of search criteria via a graphical user interface. By way of example and not limitation, a user may select from a drop-down menu of potential attributes to query and then select a range within those selected attributes, a user may type their search according to a search or query protocol such as Boolean or structured search, or a user may select from a variety of pre-organized search terms in the form of check-boxes, drop-downs, or radio buttons. One skilled in the art will understand there may be various other ways by which to present a user with a graphical user interface in order to allow the user to search or query upon the intended database, all of which are possible embodiments of the disclosed system and method. Once the user has entered and requested execution of its query or search via a graphical user interface at step 710, a system employing the disclosed system and method may translate this query into a format which may be described as a digitized spatial vector query at step 720. The principles of how to generate a digitized spatial vector query are that of the principles of characterizing a subscriber by generating a subscriber spatial search vector number. At step 720, instead of taking data associated with the traits, attributes or characteristics of individual subscribers and generating a subscriber spatial search vector number for each subscriber using the disclosed system and method, one would use the user-entered search or query to generate the digitized spatial vector query for a hypothetical subscriber having only those traits, attributes, or characteristics. Therefore, if a subscriber shared and only possessed the traits, attributes, or characteristics of the query entered by an end user, that subscriber's subscriber spatial search vector number would share identity with the digitized spatial vector query created at step 720 of the disclosed system and method. At step 730, a vector search is performed on the subscriber store spatial search vector number using the digitized spatial vector query using simple modulo division and bitwise operations to obtain hits based on subscribers which return a remainder of zero when said simple modulo division and bitwise operations are performed. With these results in mind, at step 740, a random sample of "y" percentage of subscribers may be sampled based on the hits returned at step 730 which may then be compared with the random sample "x" percentage of the overall population of subscribers obtained in step 620 of FIG. 6. Having a baseline of traits, attributes, and characteristics of a total subscriber population loaded into a memory for use as an insight cache and a sampling of subscribers based on the query entered, the disclosed system may then compare the overall subscriber population to that of the sub-population of the query and do so on-the-fly at step 750. By performing a regression analysis at step 760, a determination may be made as to the quality of the insights that may be relied upon based on the difference between the overall subscriber population and the sub-population. This may be conducted by using a regression analysis to assess the strength of relationship between profiles that were obtained as hits from an end-user query and those that reside in the overall subscriber profile store. By sampling multiple times, the results and/or the overall subscriber profile store or by assigning a greater number to x or y when sampling the populations, distinctions between the populations may be relied upon more confidently. Step 740, step 750, and step 760 may be performed several times and the results may then be reported to the user at step 770. If after multiple samples, inconsistency is detected between the overall differences in population, the user may be informed that no insight may be strong enough to be relied upon. If, however, after multiple random samplings a consistent difference between the subscriber profile store and the results of the query's sub-population is determined, the user may be informed of a high confidence in the insight that may be gathered from the distinction. In either case, this confidence level may similarly be reported along with the results at step 770. By way of example and not limitation, a particular segment of the subscriber population may be shown, based upon a query of the subscriber profile store, to have a 45% spend on voice versus the overall subscriber population with a greater spend on voice of 63%. If the variance after multiple random samplings of each population and sub-population fluctuated only +/−2% points, one may be very confident that this distinction in overall voice spend was associated with the end-user's query. If, however, these fluctuated at a much greater percentage after random sampling, the end-user's query may not be closely associated with an explanation for the difference in voice spend, thereby not being a necessarily valuable insight of the subscriber sub-population. Since the disclosed system and method of querying a subscriber store spatial search vector number and sampling the results using statistical regression analyses may lead a user performing research on a subscriber population to certain determinations about that subscriber population and any sub-populations therein, it may be understood as a heuristics-backed insight engine by one skilled in the art because it seeks out a solution to a given problem in multi-dimensional space while assigning confidence as to the probability that the results may be relied upon and differentiates highly confident insights from those of less confidence down a path toward an acceptable answer.

Figure 8:
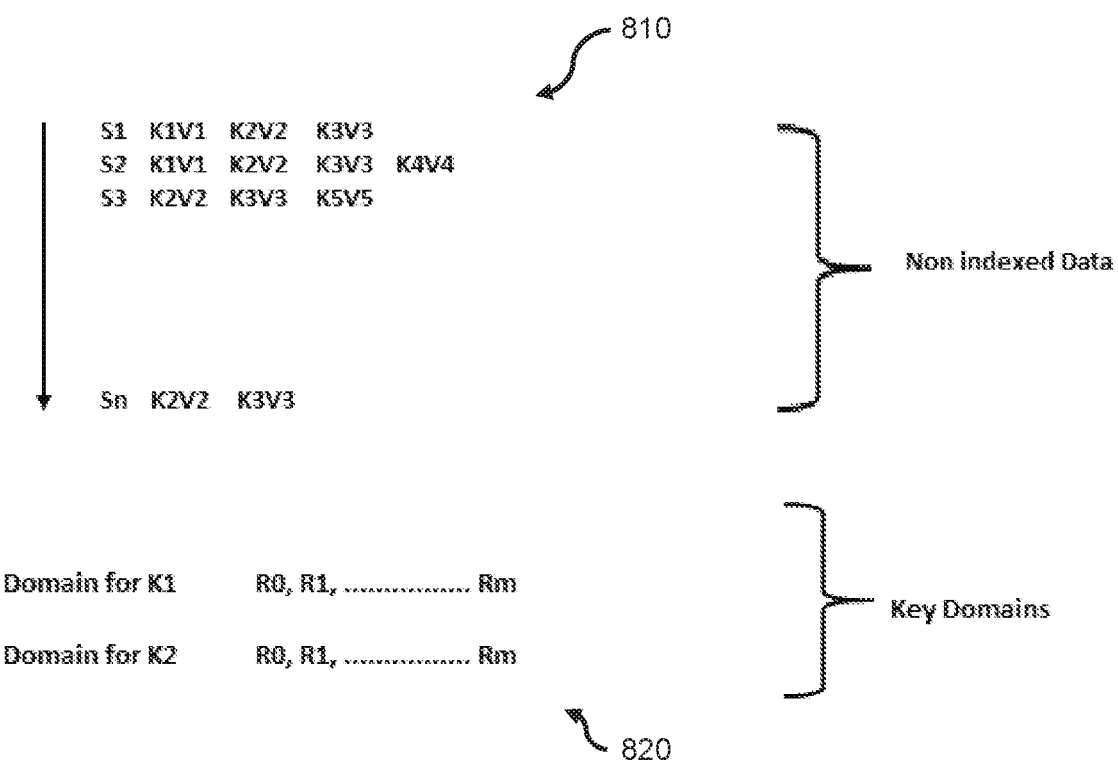
FIG. 8 is a diagram representing a non-indexed subscriber data set stored on a data store.

Referring now to FIG. 8, there is illustrated a diagram representing a non-indexed subscriber profile store, or a subscriber data set stored on a data store. The data in this example subscriber profile store 810 is represented by subscribers S1, S2, S3, through Sn. Each subscriber may have certain traits, attributes, or characteristic types "K"

each having an associated value of "V". By way of example and not limitation, K1 could be the data consumed by a subscriber during a day and V for a particular subscriber could be 10.2 MB. Subscribers may vary in the associated traits, attributes, or characteristic types as reflected on the subscriber profile store 810, just as they may vary in the associated values thereof. For example, in the illustrated subscriber profile store 810, subscribers S1 and S2 each have values associated with K1 of V1, but subscriber S3 has no associated value for K1. Similarly, subscribers may share identity for values V, given an identical value for the associated trait, attribute, or characteristic on the database. Again, by way of example and not limitation, a subscriber may have never sent a text message over a given period and two subscribers may have sent exactly 1,202 text messages over the same given period. If instead K1 were associated with text messaging consumption over this period, the third subscriber would have no record on the subscriber profile store 810, as show in FIG. 8, while the subscribers each sending exactly 1,202 messages would share a V value associated with K1, e.g. K1V1. Given subscriber profile store 810, a domain or Key Domains 820 may be established and values assigned for all potential values V, which may be called R0, R1, through Rm, where all potential values V would be accounted for in each domain for K1, K2, etc. with associated Key Domains 820 of R0, R1, through Rm according to the V values in subscriber profile store 810. That is not to say that every potential value for V must have its own potential R value, as discussed above, data may be approximated or ranged in order to condense the required number of possibilities required to represent a given amount of possible values for data.

Figure 9A:
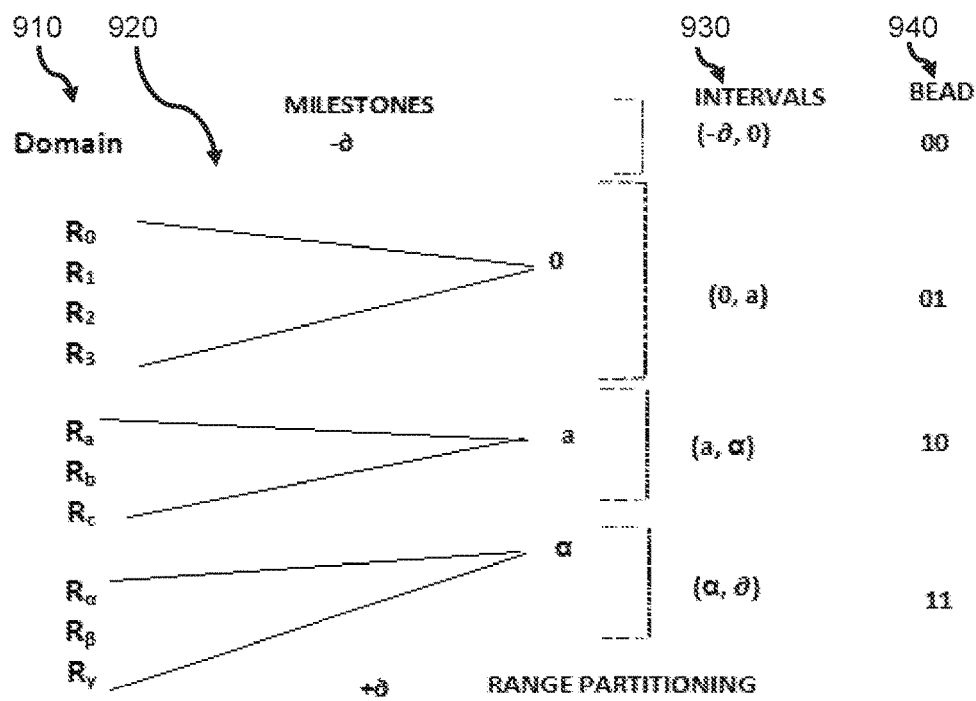
FIG. 9a is a diagram representing the disclosed method of analyzation of each dimension to generate a domain set listing all key values in the domain.

Referring now to FIG. 9a, there is illustrated a diagram representing the disclosed method of analyzation of each dimension to generate a domain set listing all key values in the domain in order to digitize the information contained on a subscriber profile store 810 based on Key Domains 820. The domains 910 within the Key Domains 820 may be further condensed into milestones 920. These milestones 920 share start and end points with each other over intervals 930. By way of example and not limitation, domains 920 may be the number of daily text messages a subscriber receives and could be any number between 0 and 1,555, if 1,555 were the maximum number of messages a user in subscriber store 810 has received. Then, domains 920 may be all integers between 0 and 1,555, intervals may be all integers between 0 and 10, 11 and 20, 21 and 50, and so on. An interval maximum may be set to 500, for instance, where any subscriber receiving more than 500 messages in a day may be associated with this interval. Finally, bead values 940 may be assigned to each interval. In the illustrated example, the bead values are provided in base 2 binary in order to show how a large range of data may be represented in a small number of bits per subscriber, or only 2 bits of information in this case may show 4 intervals 930.

Figure 9B:
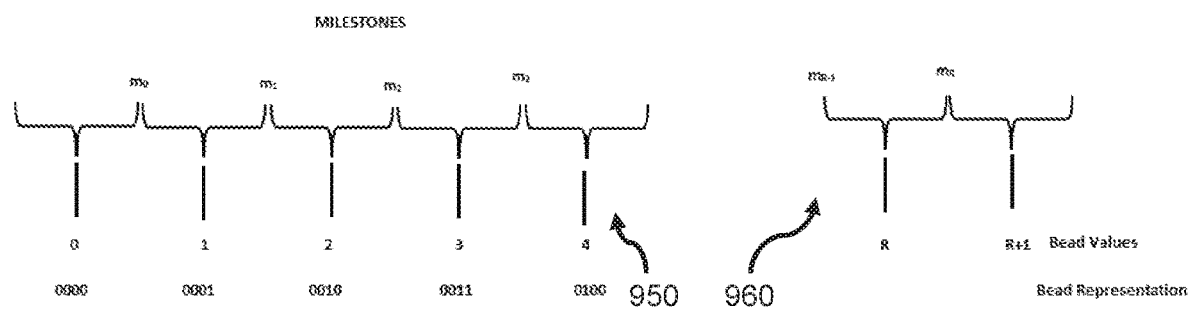
FIG. 9b is a diagram representing the disclosed method of generating a bead width for each dimension.

Referring now to FIG. 9b, there is illustrated a diagram representing the disclosed method of generating a bead width for each dimension. Here, examples of bead values 940 are shown as binary bead values 950 and hypothetical bead values 960 across milestones 920. In order to store K distinct values in binary, one may calculate $\log_2 K$ distinct bits in order to come up with a bead width for each of the dimensions which may hold a unique value for any milestones 920. This is because when computers store values in bits, each bit holding 2 potentially distinct units of information 1 or 0, and K bits can therefore store $2^K$ distinct values. This allows one to work backward to assign hypothetical bead values 960 for a given number of milestones 920 based on the number of potential values.

Figure 9C:
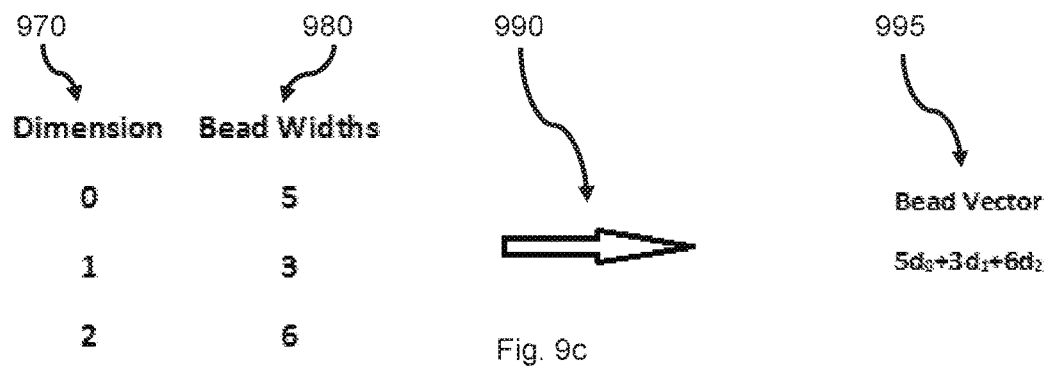
FIG. 9c is a diagram showing a simplified subscriber data set and its corresponding bead vector.

Referring now to FIG. 9c, there is illustrated a diagram showing a simplified subscriber data set and its corresponding bead vector 995. Now having Key Domains 820 with domains 910, each residing within milestones 920 having intervals 930 with associated bead values 940 and calculating the hypothetical bead values 960 using the formula provided above, one can establish a bead vector according to the dimensions 970 and example bead widths 980 using the bead vector conversion 990. For instance, if there are 3 domains or dimensions 970 with example bead widths 890 of 5, 3, and 6 bits each, then the bead vector would be $5d_0 + 3d_1 + 6d_2$. In this example, a total of 14 bits may be sufficient to represent any vector entity formed on these bead vectors in the target space. On each of the dimensions 970, there are a max of $2^{b_i}$ values where $b_i$ denotes the $i^{th}$ qualifier in bead vector 995. In the example illustrated in FIG. 9c, the total vector space would have a volume of $2^5 \times 2^3 \times 2^6$, or $2^{14}$.

Referring now generally to FIGS. 9a-9c, once the total vector space required for a given bead vector 995 is calculated, the individual values residing in each of the domains 910 within the Key Domains 820 may be analyzed in order to establish the proper milestones 920 having the proper intervals 930, thereby assigning each of them bead values 940. The bead values 940 are formatted as having each an associated bead width corresponding to milestones 920 and intervals 930 so as to leave no holes or overlap. The disclosed system and method as it may be understood to be show in FIGS. 9a-9c may guarantee that every key within Key Domains 820 from the search space may be translated onto an instance within a bead vector 995. When iteratively laid beside or next to each as described in the flowcharts of FIGS. 4-7 and the diagram of FIG. 3, one can obtain the subscriber spatial search vector number and the subscriber store spatial search vector number, which may be a digitized version of all data related to a single subscriber in a subscriber profile store 810 and all data related to all subscribers in a subscriber profile store 810, respectively. Then, one skilled in the art may recognize such numbers as simply a binary representation of all bead values 940. Then having a subscriber store spatial search vector number, it is possible to extract any single dimensional value from said subscriber store spatial search vector using simple modulo arithmetic followed by bitwise operations and returning subscribers as results when a remainder of modulo division is equal to zero and when bitwise operations yield a match.

Figure 10:
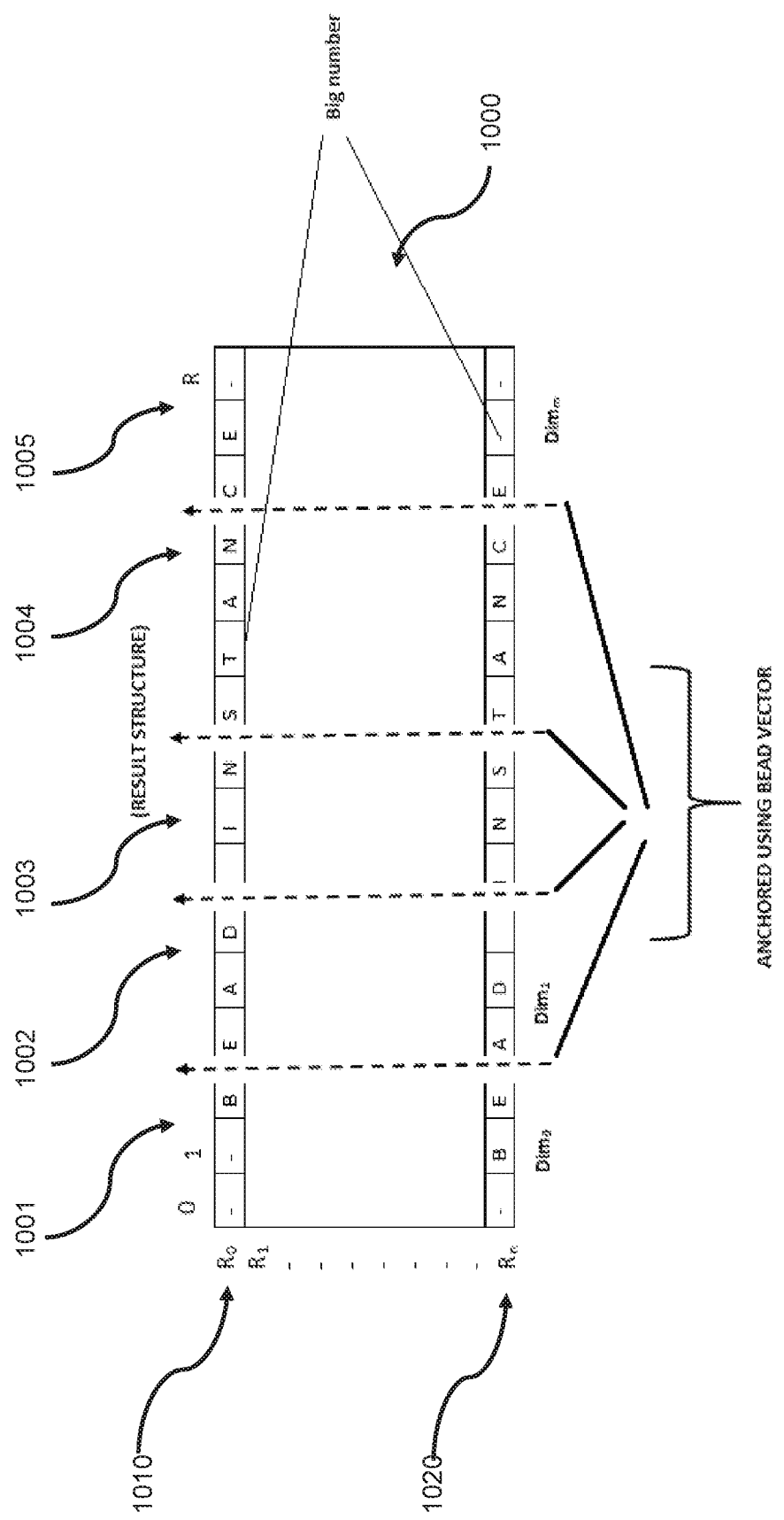
FIG. 10 is a diagram of the disclosed search index structure.

Referring now to FIG. 10, there is illustrated a diagram of the disclosed search index structure. Therein displayed may be result structures of key domain $R_o$ 1010 through key domain $R_n$ 1020. Thereon said key domains may reside bead instance 1001, bead instance 1002, bead instance 1003, bead instance 1004, and bead instance 1005 representing dimensions 0 through m. Since the disclosed structure as illustrated therein is so structured, it lends itself to free-flowing search because a column or each bead instance represents a single dimension, each of which may be skipped by jumping over at offsets determined by a corresponding bead vector. Search may be performed in any order as the dimensions themselves may be well laid out and marked or mapped beforehand. Searching and querying may further be performed in parallel on different dimensions as they reside independently from each other. When modelled as modulo arithmetic followed by bitwise operations, a search may be translated from the data structure domain to an arithmetic domain. In this way, there is no requirement to look up any single value for individual comparison. For a search vector $S_v$, having query values of $S_1$ through $S_k$ corresponding to a multitude of dimensions $d_1$ through $d_k$, one skilled in the art may model the corresponding search arithmetic as $\{S_1d_1+S_2d_2++S_kd_k\}$. Then to determine if the subscriber store spatial search vector number aligns with search vector $S_v$, it is sufficient to calculate whether the two numbers divide using bitwise XOR, and by doing so leaving no remainder, thereby generating a hit on that instance. This allows a user to perform a search or query using multiple dimensions at extremely high speeds without having constraints on the number or order of dimensions due to the layout transformation described herein enabled by simple modulo arithmetic and bitwise operations along a subscriber store spatial search vector number.

By way of example and not limitation, the disclosed system and method may be used by a telecommunications company or a telecommunication services provider to determine which subscriber(s), from among a plurality of telecommunication subscribers, to offer a service. A difficult challenge for telecommunication companies offering a wide variety of services, including but not limited to wireless voice, wireless SMS, and wireless data, to a large number of subscribers, is determining the most relevant services and segments or levels of services to market to its subscribers. The telecommunications company may have at least one transactional data store, which may house transactional data or metadata related to the plurality of telecommunication subscribers' interactions with the telecommunication service. As described above, previous methods to identify these customers may be to generate an index to better navigate and use the pre-summarized tables or query for subscribers having certain traits, attributes, or characteristics, to either analyze the data and identify the relevant subscribers or run scheduled queries or generate ad-hoc reports based on the like. By receiving a list of customers in the identified segments of interest, a telecommunications company may regularly offer its service upgrades to those subscribers identified. However, there exist shortfalls to this known method due to the requirement of sophisticated or expensive equipment and time required to generate and maintain a sufficiently sophisticated index as described above. Telecommunication companies may wish to have access to more up to the minute data or alternatively may wish to deploy such a system on less expensive or sophisticated equipment.

With these desires in mind, in a hypothetical example of an exemplary query generated using the disclosed system and method for use of a subscriber population for a telecommunications company, the company may first connect its transactional system with a data store to the disclosed system capable of performing the disclosed method. Having so connected the disclosed system to a transactional data store, it could generate subscriber spatial search vector number for each subscriber having information in its transactional store and a subscriber store spatial search vector number based on a plurality of data associated with a plurality of subscribers and categories having a plurality of values associated with said plurality of subscribers, categories, and data and perform a query upon the data housed within the subscriber profile store through converting a query into a digitized search vector and using modulo arithmetic followed by bitwise arithmetic, identify the relevant subscriber sub-population sharing the characteristics, traits, or attributes of the relevant query. A user input, using the disclosed system could be used to generate such a digitized search vector, and by doing so, a user could identify a set of fields or successive sets of fields to so identify each subscriber sub-population of interest.

Having incorporated the disclosed system into its system, an exemplary system being configured for display of information via a graphical user interface, for analyzing its subscriber population and having built the disclosed system to perform the proposed method, it could then perform an example analysis. Wishing to determine whom among its subscribers would be the most lucrative to market additional voice and data services, it may first categorize dimensions for analysis as subscribers who spent more than $0.00 in the last month and have a smart phone based on the number of qualifying subscribers, their average age-in-network, and their average revenue per month. When viewing the data in a summarized format, a typical graphical user interface may show in a resulting table or pivotal analysis tool based on the information returned when performing the disclosed method on a disclosed system, the following: the total qualifying subscribers, their average age-in-network, and their average total revenue per month. It may also rank or sort fields for use in the order from most likely to least likely to be used based on a variety of factors including, by way of example and not limitation, user-defined preferences, popularity of use among any cross-section of users, programmer defined sorting or ranking, and/or some combination of the like. Satisfied with this summary, a user wishing to further explore the data associated with this subscriber population may wish to receive summary statistics or insights based on the sub-population of subscribers in comparison to the total subscriber population. The disclosed system may then perform a regression analysis or successively perform a series or succession of regression analyses and compare the results of the query to the overall subscriber population, thereby informing the user whether the search query and the data and values associated with the corresponding categories could be reasonably relied upon to offer promotions and/or predict the behavior of the subscriber sub-population generated in the query. Depending on the traits, attributes, and characteristics of the subscriber population, the results of this query may be able to reveal, in a hypothetical result of a hypothetical query, that a telecommunications company's subscribers having over three years in network would represent the highest total average revenue per unit. Now knowing this information about a group or grouping of individual types or subscriber types, it may wish to determine which, if any, further attributes this subscriber sub-population share, and may run a further query on this subset of subscribers having over three years in network and possessing the previously used traits, attributes, and characteristics, as it may represent its most profitable subscriber category. Selecting this subset using a graphical user interface that allows a user to query for this attribute by simply selecting it from either rows or columns, it could then, for example, query for the attributes of voice spend over the past 30 days and data spend over the last 30 days. The disclosed system would then perform the disclosed method to generate a digitized search vector capable of performing the specified query upon the subscriber store spatial search vector number, using the dimensions of voice and data spend over the last 30 days. After having done so, another pivot table could be generated, this time with columns of banded categories for data spend and rows for voice spend. The plurality of cells would each represent a subscriber population which may be the most profitable subscribers, divided into categories based upon their consumption of voice and data. Subscriber sub-populations in cells with low voice spend and high data spend may be offered additional voice services and subscriber sub-populations in cells with low data spend and high voice spend may be offered additional data services. The cells of interest, which would represent a grouping of individuals or subscribers, could then be exported as a list of individuals or subscribers for later targeted marketing. These cells or groupings of cells, by virtue of being a grouping of individuals or subscribers sharing similar characteristics, may refer to an individual type, a group of individual types, or a grouping of individuals sharing a common behavior or usage pattern.

In select embodiments, additional fields and data may be of interest. For telecommunications companies, by way of example and not limitation, these fields and/or data may include streaming video consumption, streaming audio consumption, internet-based gaming activity, social media activity measured in data or time, web browsing behavior, international calling behavior, international roaming behavior, and/or combinations of the like.

A system and method for multi-dimensional real time vector search and heuristics backed insight engine was built and implemented according to the disclosure on a machine having accesses to and having requested a small subset of a 100-member population of subscriber data from a telecommunication services provider in order to provide a simplified understanding of the disclosed system and method. By way of comparison, a telecommunication services provider may have tens or hundreds of millions of subscribers, rather than only 100. In this example, only three search attributes of interest were included: age on network, spend in the previous 7 days, and user engagement index. By way of comparison, in a typical search index of the disclosed system and method for a typical telecommunication services provider, 500 or more search areas of interest may be used during establishment of the disclosed system using the disclosed method. Age on network range was set to between 0 and 10 years, spend in previous 7 days range was set between $0 and $1,000, and engagement index range was set to between 0 and 31. During the milestones and mapping library creation steps of the disclosed method to build the disclosed system, the age in network field was set to a daily granularity, containing 3,650 bins over 10 years. By scanning through 100 subscribers in order to populate each daily bin, one could determine using a histogram-like data model how many subscribers shared the same age on network. For example, if 10 out of the 100-subscriber population had been on the network for only 5 days, this bin would contain 10 subscribers, or the counter on bin 5 would be 10. For the sake of better understanding, if one were to assume that a prudent determination for bit allocation were 8-bit granularity, the age on network field would have $2^8$ bins, or 265 bins. Markers may be placed at 256 places along the age on network daily bins between 0 and 3,650 such that there would be on 3,650/256 or 14 subscribers between any two markers. These markers are the milestones of the disclosed method. The disclosed system and method then generate a mapping function that can take an age on network as an input and return the most proximal or closest milestone. As there are 256 milestones, one using the disclosed system and method could encode each milestone in 8 bits, for an 8-bit bead width. The face value, or value, of a milestone may be obtained via a simple reverse lookup when needed. If spend within previous 7 days were assigned 12 bits, it would allow for granularity of 4,096 different values or bins and if engagement index, being a small number, were allocated 5 bits, it could receive integer-level granularity only having 0 through 31 integers with 32 possible values or bins. The total enclosure volume of such a data set using the disclosed system and method would be calculated by calculating the volume of the corresponding hypercube, or in this case simply the corresponding cube: $2^8 \times 2^{12} \times 2^5 = 256 \times 4096 \times 32 \sim 32$ million units. Every subscriber in this sample data set, cam be represented as a unique point in space in the cube using a tuple value of <x,y,z>. For example, a subscriber in this population in the $110^{th}$ age on network bin, in the $2,112^{th}$ weekly spend bin, and the $16^{th}$ engagement bin would appear in Euclidian space within the cube at <110, 2112,16>. Since one skilled in the art would understand that a cube of any dimension may be folded into a line in such a manner that every distinct 3-tuple may be mapped to a distinct point on the line, one such transformation of <x,y.z> as Euclidean coordinates is: x*(area formed by the rectangle y–z)+y* (length of side z)+z. In this three-tuple example that could be calculated as [110×(4096×32)]+[2122×32]+16=14,485, 840. 4096×32, 32, and 1 are the weights for each dimension x, y, and z, respectively. This 14,485,840 would represent the subscriber spatial search vector number for this particular subscriber in this population. The number represents all traits determined in the query and may be used in the larger subscriber store spatial search vector number and when converted into base 32 million, it may be represented as only one digit in said subscriber store spatial search vector number. For 100 subscribers, the subscriber store spatial search vector number would comprise 100 digits, or a 100-digit number in base 32,000,000, where each digit requires 25 bits to express.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein, but is limited only by the following claims.

What is claimed is:

1. A method for performing a multi-dimensional vector search and providing a heuristics backed insight engine, the method comprising the steps of:

accessing an at least one data set on a transactional data store, said at least one data set containing information pertaining to a plurality of subscribers, each of said plurality of subscribers corresponding to a unique subscriber identifier;

requesting a data from a plurality of categories of information from said at least one data set stored on said transactional data store;

determining a range of integers to represent each of said plurality of categories of information, thereby allocating a magnitude of bits to represent a total number of possibilities of values associated with said plurality of categories of information for each of said plurality of subscribers;

calculating a plurality of subscriber spatial search vector numbers, one of said plurality of subscriber spatial search vector numbers for each of said plurality of subscribers, having thereon each of said plurality of subscriber spatial search vector numbers an integer selected from said range of integers associated with said plurality of categories of information and said plurality of subscribers;

iteratively assembling a subscriber store spatial search vector number by successively assembling each of said plurality of subscriber spatial search vector numbers;

receiving a user query, said user query having an at least one value associated with said plurality of categories of information;

converting said user query into a digitized spatial vector query, said digitized spatial vector query having the properties of a subscriber spatial search vector number with said at least one value associated with said plurality of categories of information; and performing a modulo division upon said subscriber store spatial search vector number to identify which of said plurality of subscribers is associated with said at least one value associated with said plurality of categories of information;

wherein a determination as to which of said plurality of subscribers are to be returned as a result of said user query is made when an associated remainder of a subscriber spatial search vector number is equal to zero after said modulo division has been performed upon said subscriber store spatial search vector number.

2. The method of claim 1, wherein the method is performed by a user via a graphical user interface at a computer having a display.

3. The method of claim 2, wherein said graphical user interface allows a user to select said user query from a group of available user queries.

4. The method of claim 1, further comprising the steps of performing a regression analysis upon by comparing a set of values associated with at least a random sampling of said plurality of subscribers with said result.

5. The method of claim 4, further comprising the step of iteratively performing said regression analysis upon a succession of random percentage samplings in order to determine whether said at least one value associated with said plurality of categories of information received from said user query differentiates said result from said plurality of subscribers.

6. The method of claim 1, wherein said plurality of subscribers comprise a group of subscribers of a telecommunications service provider.

7. The method of claim 6, wherein said plurality of categories of information comprises information regarding an at least one activity of said plurality of subscribers on said telecommunications service provider's network.

8. The method of claim 1, further comprising the step of performing a bitwise operation by comparing said digitized spatial vector query against each of said subscriber spatial search vector numbers for each of said plurality of subscribers returned as said result.

9. The method of claim 1, wherein said subscriber store spatial search vector number is stored in an at least one computer readable medium from a group of computer readable media consisting of random-access memory, solid-state drive, or hard disk drive.

10. The method of claim 9, wherein said subscriber store spatial search vector number stored on said at least one computer readable medium may be accessed remotely via an internet.

11. The method of claim 1, further comprising the steps of performing a second user query said second user query having an at least one additional value associated with said plurality of categories of information;

converting said second user query into a second digitized spatial vector query, said digitized spatial vector query comprising a set of properties of said subscriber spatial search vector number with said at least one additional value associated with said plurality of categories of information; and performing a second modulo division upon said subscriber store spatial search vector number to determine which of said plurality of subscribers is associated with said at least one additional value associated with said plurality of categories of information;

wherein each of said plurality of subscribers returned as a result of said second modulo division has a second associated remainder equal to zero.

12. A system comprising an apparatus having at least one processor and at least one memory including computer program code having a means to access at least one transactional data store, the at least one memory and the computer program code configured to, with the at least one processor, cause the system to:

access an at least one data set on a transactional data store, said at least one data set containing information pertaining to a plurality of subscribers, said subscribers each corresponding to a unique subscriber identifier;

request a data from a plurality of categories of information from said at least one data set stored on said transactional data store;

determine a range of integers to represent each of said plurality of categories of information, thereby allocating a magnitude of bits to represent a total number of possibilities of values associated with said plurality of categories of information for each of said plurality of subscribers;

calculate a plurality of subscriber spatial search vector numbers, one of said plurality of subscriber spatial search vector numbers for each of said plurality of subscribers, having thereon said subscriber spatial search vector number an integer selected from said range of integers associated with said plurality of categories of information and said plurality of subscribers;

iteratively assemble a subscriber store spatial search vector number by successively assembling each of said plurality of subscriber spatial search vector numbers;

receive a user query, said user query having an at least one value associated with said plurality of categories of information;

convert said user query into a digitized spatial vector query, said digitized spatial vector query comprising a set of properties of said subscriber spatial search vector number with said at least one value associated with said plurality of categories of information; and perform a modulo division upon said subscriber store spatial search vector number to determine which of said plurality of subscribers is associated with said at least one value associated with said plurality of categories of information;

wherein each of said plurality of subscribers returned as a result of said modulo division has an associated remainder equal to zero.

13. The system of claim 12, further comprising a graphical user interface.

14. The system of claim 13, wherein said graphical user interface allows a user to select said user query from a group of available user queries.

15. The system of claim 14, said group of available user queries comprises a range of values associated with said plurality of categories of information.

16. The system of claim 12, wherein the computer code is further configured to perform a regression analysis upon by comparing a set of values associated with at least a random percentage sampling of said plurality of subscribers with said result.

17. The system of claim 16, wherein the computer code is further configured to iteratively perform said regression analysis upon a succession of random samplings in order to determine whether said at least one value associated with said plurality of categories of information received from said user query differentiates said result from said plurality of subscribers.

18. The system of claim 12, wherein said plurality of subscribers comprise a group of subscribers of a telecommunications service provider and said plurality of categories of information comprises information regarding an at least one activity of said plurality of subscribers on a network belonging to said telecommunications service provider.

19. The system of claim 12, wherein the computer code is further configured to perform a bitwise operation by comparing said digitized spatial vector query against each of said subscriber spatial search vector numbers for each of said plurality of subscribers returned as said result.

20. The system of claim 19, wherein said subscriber store spatial search vector number may be accessed via an internet.

\* \* \* \* \*